United States Patent [19]

Tsuchiya et al.

[11] Patent Number: 5,328,124
[45] Date of Patent: Jul. 12, 1994

[54] APPARATUS CAPABLE OF LOADING A PLURALITY OF CASSETTES

[75] Inventors: Yuzo Tsuchiya; Hiroshi Suzumura, both of Fukaya; Naoki Eguchi, Kumagaya; Masayuki Hirano, Fukaya; Yoshiharu Imaoka, Fukaya; Kimihiko Nakamura, Fukaya; Mitsuru Kohara, Kumagaya, all of Japan

[73] Assignee: Kabushiki Kaisha Toshiba, Kawasaki, Japan

[21] Appl. No.: 847,693

[22] Filed: Mar. 9, 1992

[30] Foreign Application Priority Data

Mar. 11, 1991 [JP] Japan .................... 3-45206
Mar. 27, 1991 [JP] Japan .................... 3-63410
Mar. 27, 1991 [JP] Japan .................... 3-63412
Mar. 27, 1991 [JP] Japan .................... 3-63526

[51] Int. Cl.⁵ .......................................... G11B 23/04
[52] U.S. Cl. ................................................ 242/337
[58] Field of Search ............... 242/197, 198, 199, 200; 360/92, 94, 96.5

[56] References Cited

U.S. PATENT DOCUMENTS

| 4,580,183 | 4/1986 | Maeda et al. ............ 360/94 |
| 4,706,141 | 11/1987 | Oba et al. ............ 360/96.5 |
| 4,757,400 | 7/1988 | Park ............ 360/96.5 |
| 4,797,865 | 1/1989 | Imai et al. ............ 369/39 |
| 4,799,117 | 1/1989 | Ohyama ............ 242/199 X |
| 4,868,924 | 9/1989 | Ando et al. ............ 242/199 X |
| 5,018,030 | 5/1991 | Ohashi ............ 360/94 |
| 5,060,094 | 10/1991 | Chung et al. ............ 242/199 X |
| 5,089,920 | 2/1992 | Bryer et al. ............ 360/92 |
| 5,109,309 | 4/1992 | Ohoka et al. ............ 360/94 |
| 5,239,427 | 8/1993 | Ooka et al. ............ 360/96.5 X |
| 5,243,478 | 9/1993 | Kawakami et al. ............ 242/198 X |

FOREIGN PATENT DOCUMENTS

| 0060396 | 9/1982 | European Pat. Off. . |
| 0204585 | 12/1986 | European Pat. Off. . |
| 0264139 | 4/1988 | European Pat. Off. . |
| 0317370 | 5/1989 | European Pat. Off. . |
| 0389199 | 3/1990 | European Pat. Off. . |
| 0498304 | 8/1992 | European Pat. Off. . |
| 3229894 | 3/1983 | Fed. Rep. of Germany . |
| 2202986 | 10/1988 | United Kingdom . |

Primary Examiner—Daniel P. Stodola
Assistant Examiner—John P. Darling
Attorney, Agent, or Firm—Cushman, Darby & Cushman

[57] ABSTRACT

A tray unit is moved into a housing or partially pulled out from the housing by a horizontal motor provided in the housing. Since the tray unit can load a plurality of cassettes, the weight of the unit is largely changed in accordance with the number of loaded cassettes. The horizontal motor must be controlled by accurately detecting the moving position of the tray unit. The rotation of the horizontal motor is transmitted to a rotary member. The rotation of the rotary member is associated with a pulse detecting element provided on a printed circuit board for tray position detection. The moving position of the tray unit is detected by counting pulses obtained from the pulse detecting element in accordance with the rotation of the rotary member.

23 Claims, 34 Drawing Sheets

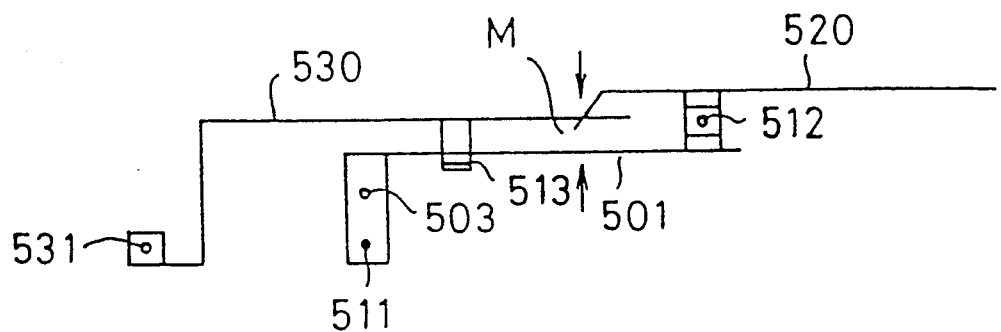
F I G. 11A
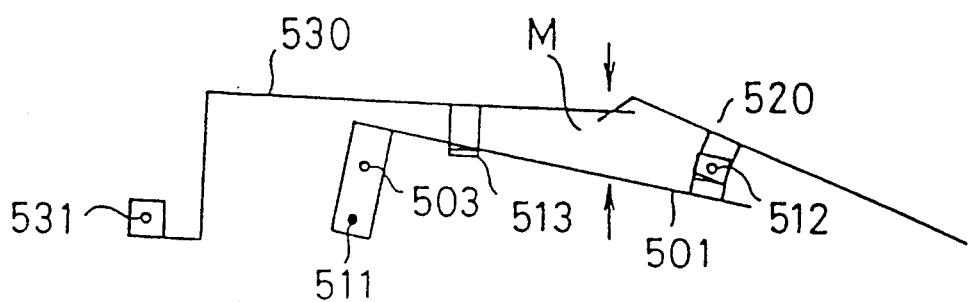
F I G. 11B
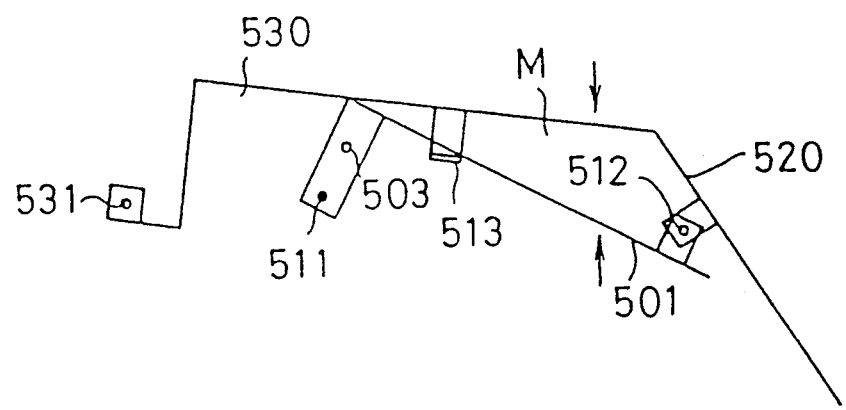
F I G. 11C

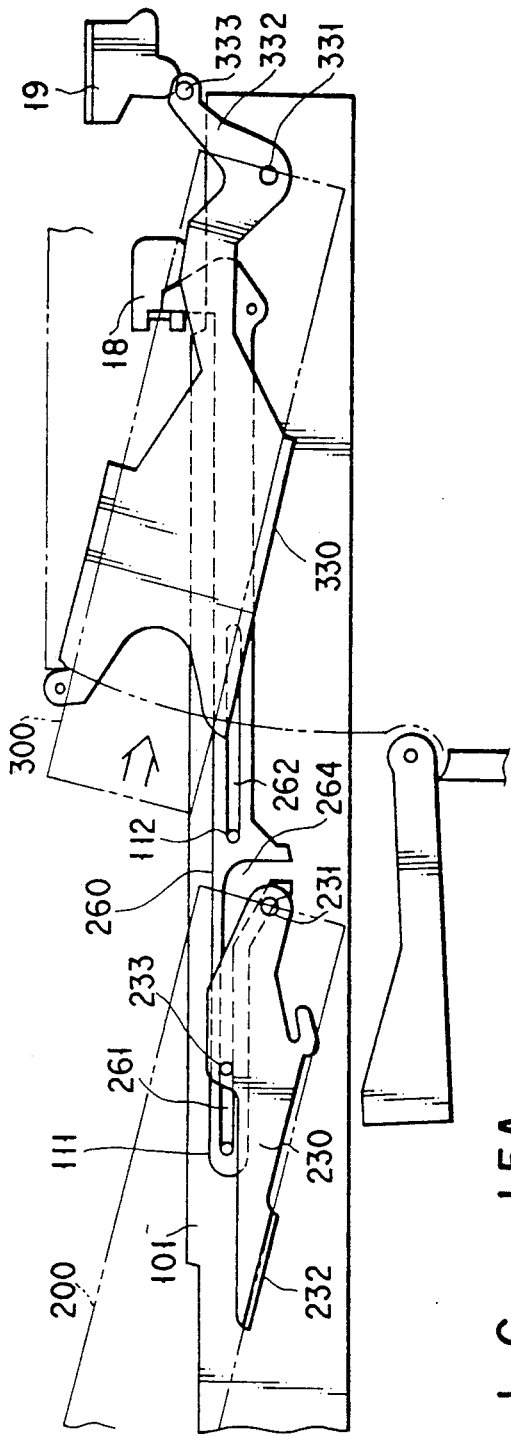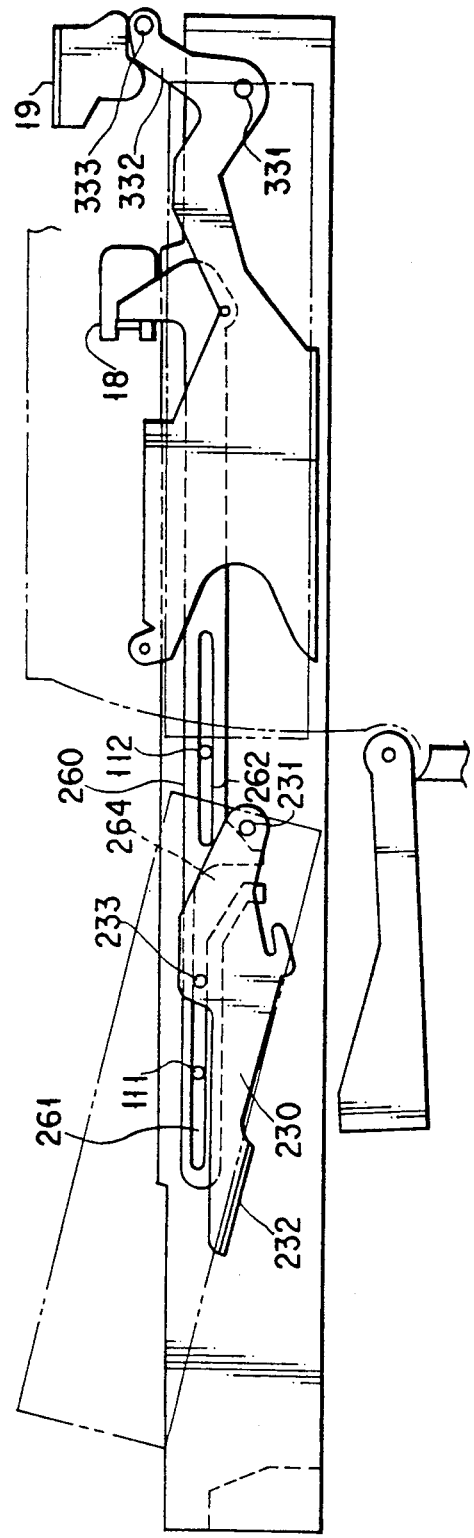
F I G. 15A
F I G. 15B

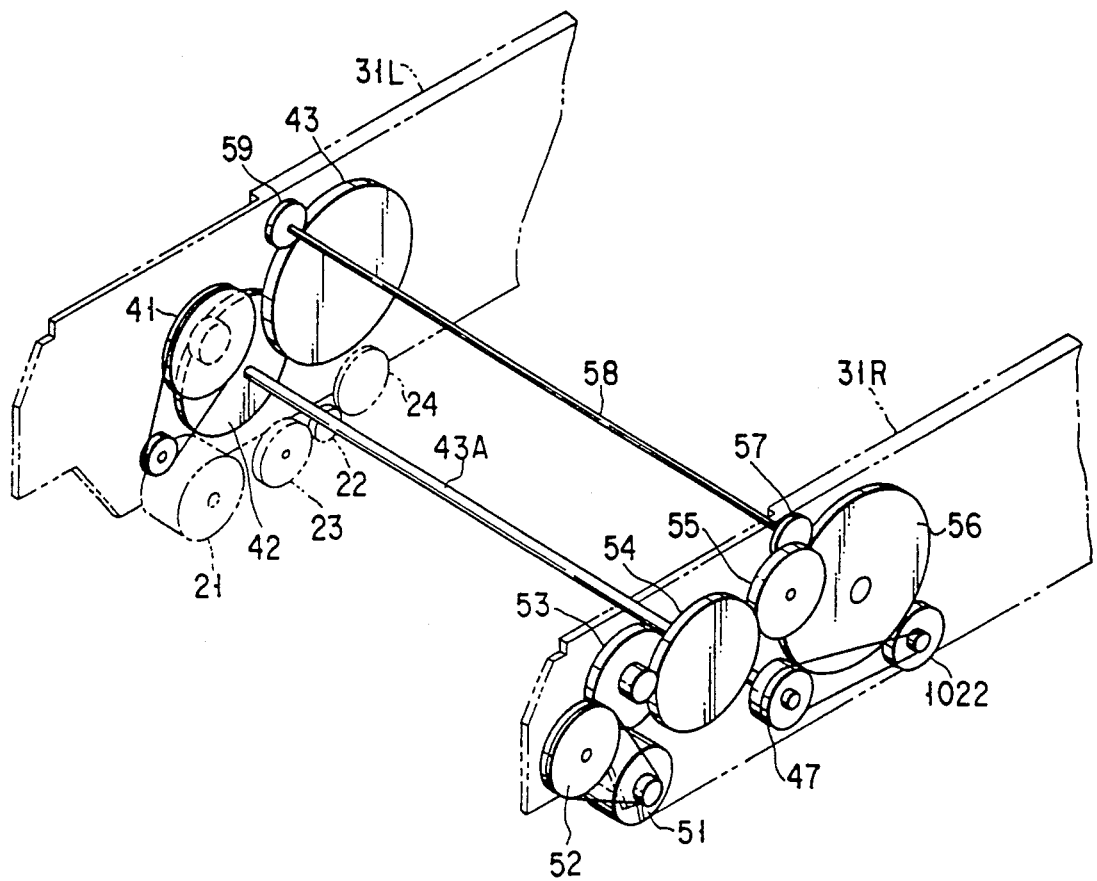
F I G. 16

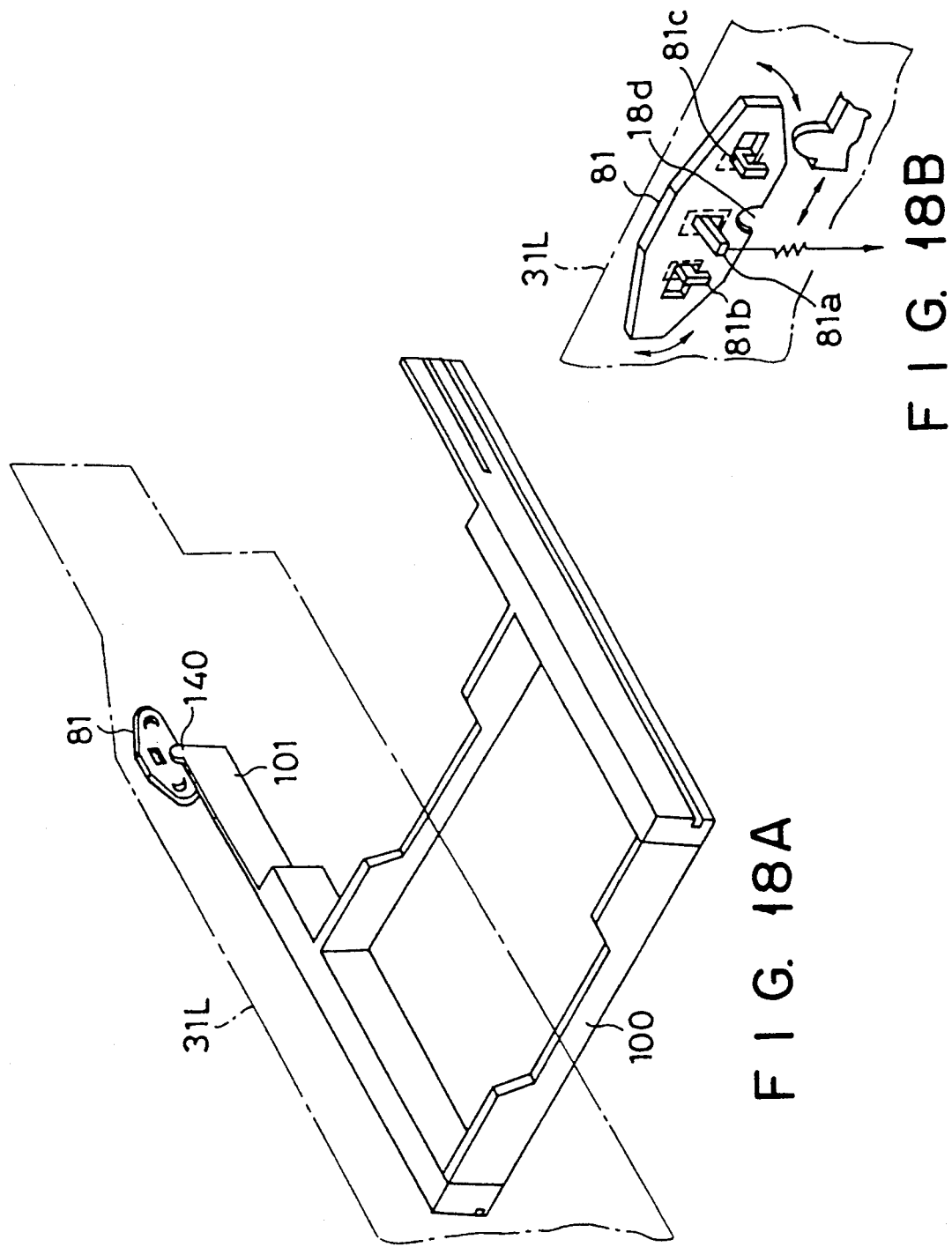

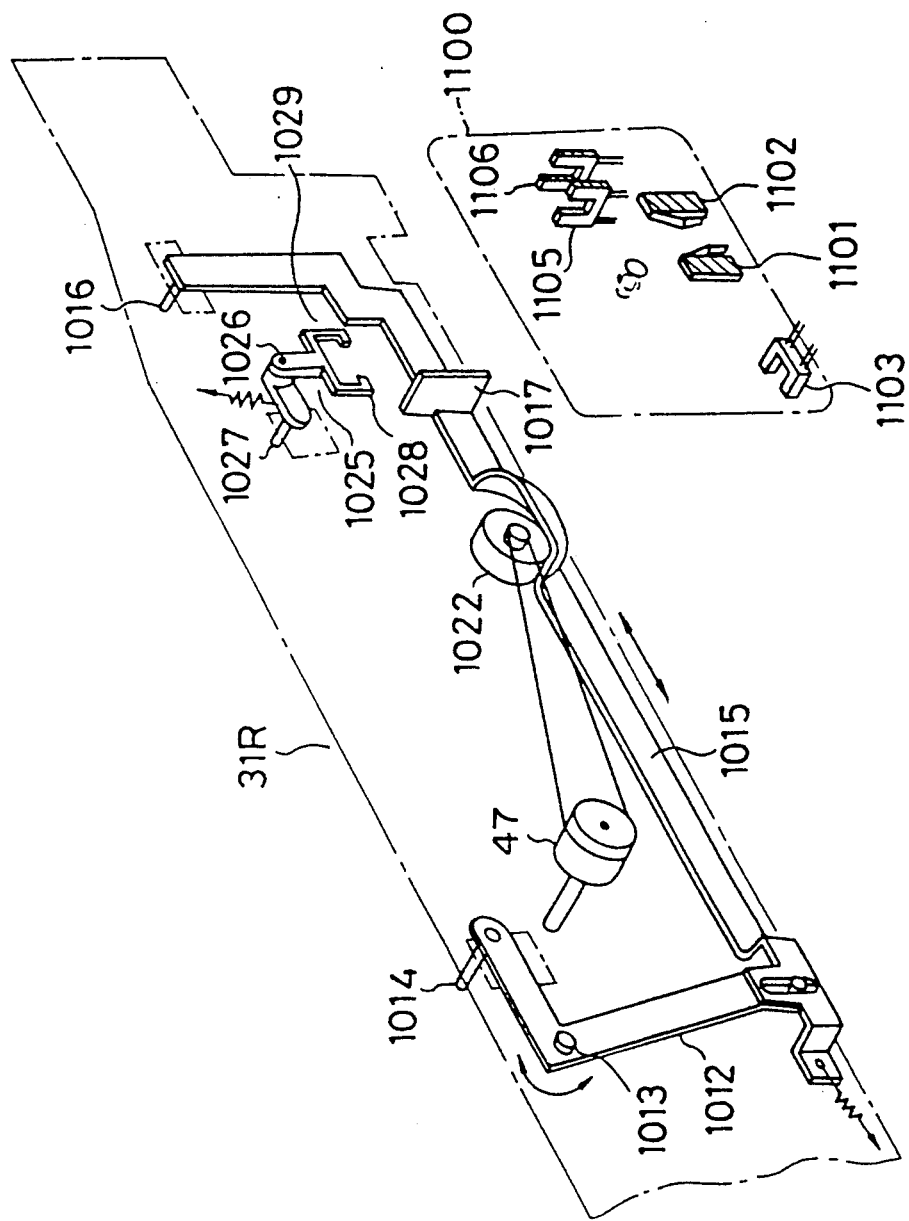

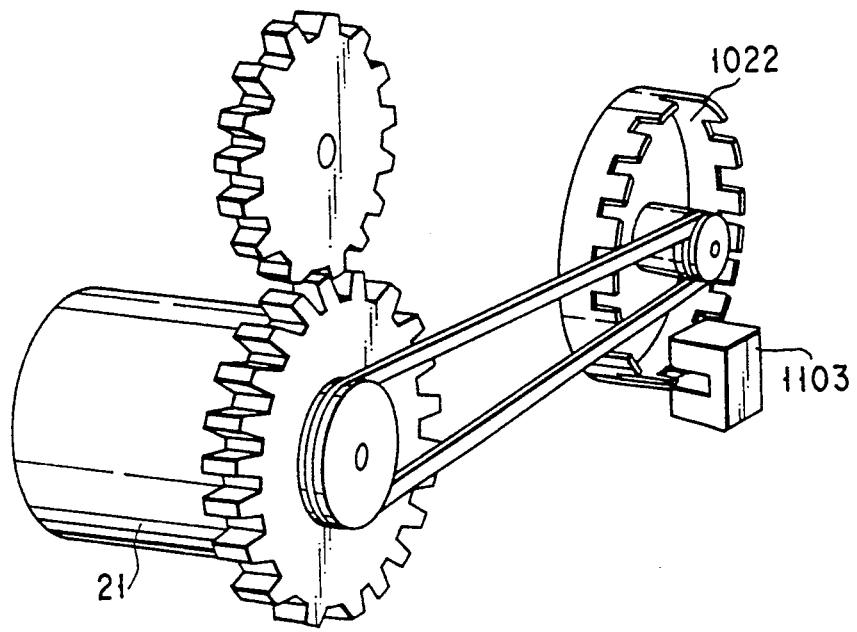
F I G. 24A
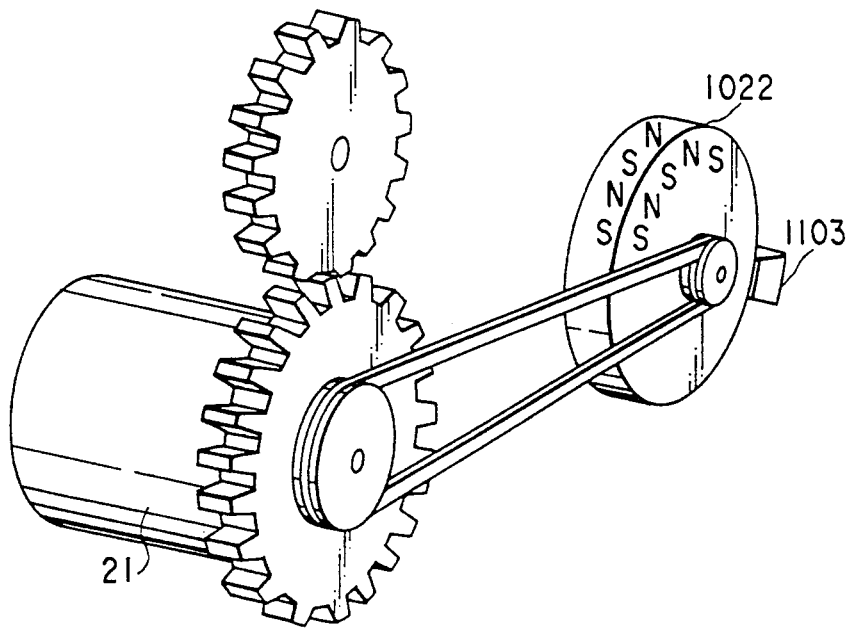
F I G. 24B

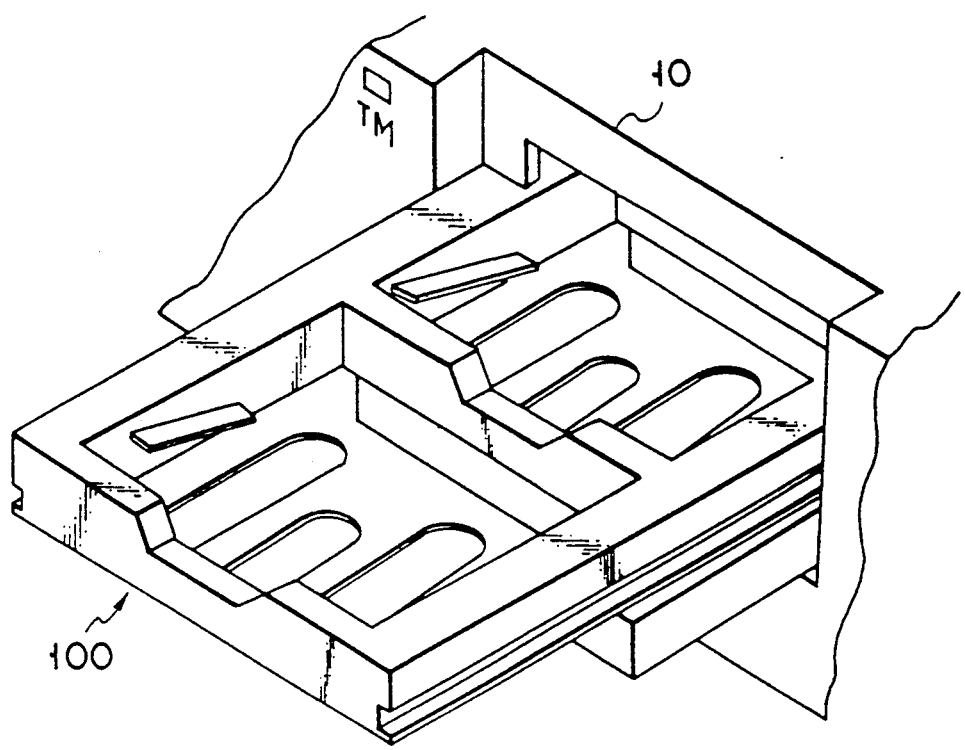
F I G. 26A
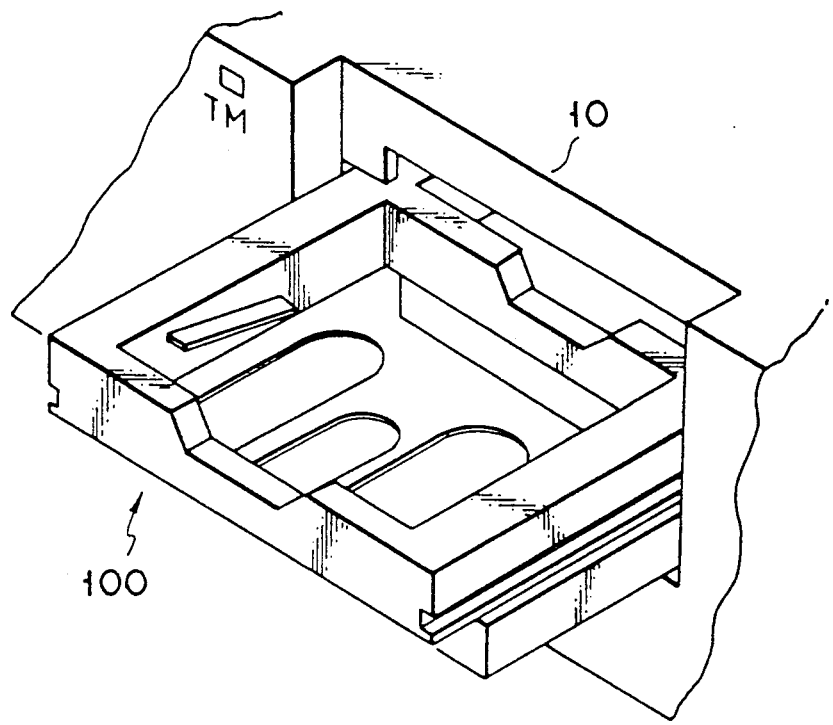
F I G. 26B

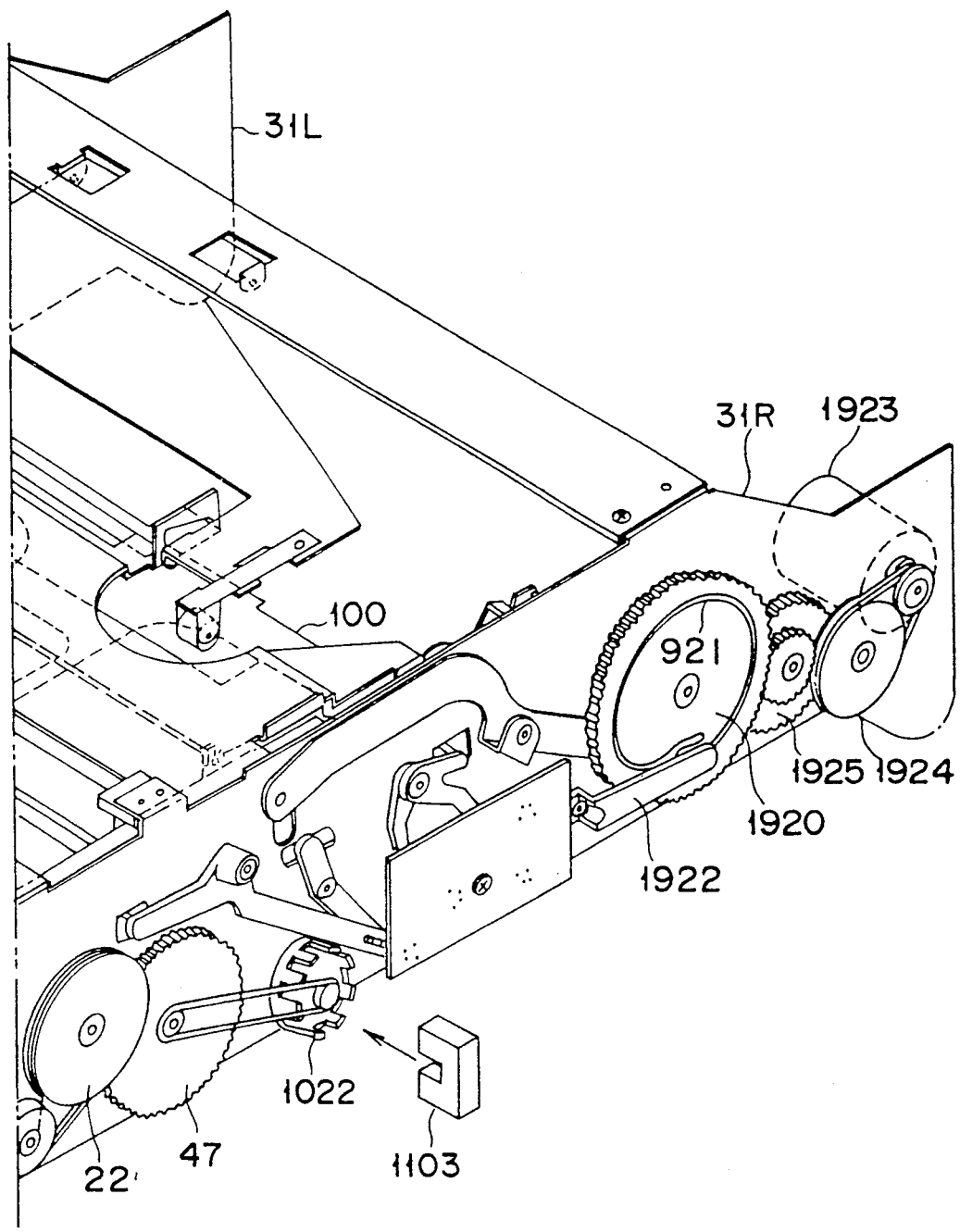
F I G. 28B

APPARATUS CAPABLE OF LOADING A PLURALITY OF CASSETTES

Background of the Invention

1. Field of the Invention

The present invention relates to a plurality of cassettes loading apparatus to be incorporated in, e.g., a video tape recorder (to be referred to as a VTR hereinafter) or a digital audio tape recorder (to be referred to as a DAT hereinafter).

2. Description of the Related Art

Recently, long TV programs have been increased in number, and the number of midnight broadcast TV programs has been increased after the start of satellite broadcasting. Therefore, the recording mode of VTRs is being changed to a mode capable of performing timer or unattended recording or long-time recording.

Existing VTRs, however, can load only one tape cassette, and this limits a recording capacity in performing long-time recording or unattended recording over extended periods. In addition, the dimensional standard of cassettes brings about limitations in the formation of large-capacity cassette tapes.

Suppose, therefore, that a VTR has a function of loading a plurality of cassettes in it in advance and selectively placing each cassette at a desired tape driving position to perform recording or reproduction. In this case, this VTR must incorporate mechanisms for moving and replacing a plurality of cassettes. Assuming that a cassette carrying unit having a capacity enough to carry and convey a plurality of cassettes is used to convey a plurality of cassettes, this carrying unit requires a driving mechanism capable of controlling movement of the carrying unit to a desired position.

It should be noted, however, that the weight of such a cassette carrying unit mounting a plurality of cassettes is largely different from that of an empty unit, and that the above driving mechanism is required to control movement of this cassette carrying unit accurately to a plurality of positions.

For this reason, the driving mechanism must perform fine control. Conventionally, mechanical position detecting switches are arranged at a plurality of fixed positions, and a driving source (motor) of a moving unit is controlled in accordance with the logic state of an output from each switch. It is, however, impossible to perform fine position detection with this means; for example, when the motor is stopped after detection, the moving unit sometimes has already passed a target position.

In addition, since the total weight of the cassette carrying unit is increased, a braking mechanism is also required. As a result, components of the system are increased in number, and this tends to complicate the system arrangement.

Furthermore, this driving mechanism requires a large motor as a power source.

If, for example, a tray system is adopted as the cassette carrying unit, this tray system requires a power source for horizontally moving the tray and a power source for vertically moving cassettes mounted on the tray. Since loads in these horizontal and vertical movements have different characteristics, an expensive and powerful motor is required to realize this arrangement with a single motor. A simple structure is also required as a switching mechanism for performing switching between the horizontal and vertical movements.

In addition, since replacement of cassettes is performed inside the VTR, the internal arrangement of the VTR tends to be complicated. In particular, the mechanism for switching the moving direction of a cassette tends to be complicated because it is constituted by a large number of components.

SUMMARY OF THE INVENTION

It is, therefore, an object of the present invention to provide an apparatus which can load a plurality of cassettes and can accurately detect a moving position of a cassette carrying unit capable of loading a plurality of cassettes and having a weight which largely changes in accordance with the number of loaded cassettes.

In order to achieve the above object, the present invention comprises a housing incorporating a tape driving section, a cassette carrying unit capable of carrying a plurality of cassettes while being located inside the housing, for alternatively conveying the cassettes to a position from which the conveyed cassette can be loaded in the tape driving section, a motor mounted at a fixed position in the housing, for moving the cassette carrying unit, a rotary member mounted at a fixed position in the housing so as to be rotated interlocking with the motor, and pulse generating means for, interlocking with the rotation of the rotary member, generating pulses in number corresponding to a rotational speed of the rotary member to generate moving data of the cassette carrying unit.

With the above means, it is possible to reliably detect position data of the tray unit or stop of the tray unit caused by an accident.

It is another object of the present invention to provide an apparatus which can load a plurality of cassettes and incorporates a mechanism capable of smoothly controlling the movement of a cassette carrying unit which is used with either a large or small weight.

In order to achieve the above object, the present invention comprises a housing incorporating a tape driving section, an opening portion formed in a front wall of the housing, a cassette carrying unit which can be horizontally inserted or removed in a front-and-back direction through the opening portion and in which a plurality of cassettes can be placed on a top surface in the front-and-back direction, a motor, mounted at a fixed position in the housing and associated with a rack of the cassette carrying unit via gears, for driving the cassette carrying unit in the front-and-back direction, a rotary member mounted on a fixed position in the housing so as to be rotated interlocking with the motor, pulse generating means for generating pulses in number corresponding to a rotational speed of the rotary member during rotation of the rotary member, and control means for counting the pulses generated by the pulse generating means to determine a moving distance of the cassette carrying unit, and varying a rotational speed of the motor as the cassette carrying unit moves closer to a predetermined target position.

The above means makes it possible to accurately and reliably stop the cassette carrying unit at a desired position even if the unit has inertia, thereby improving the reliability in an operation.

It is still another object of the present invention to provide an apparatus which can load a plurality of cassettes and has power control means suitable for different load characteristics obtained when a tray-type cassette carrying unit is moved horizontally and a cassette loaded on the carrying unit is moved vertically.

In order to achieve the above object, the present invention comprises a housing incorporating a tape driving section, an opening portion formed in a front wall of the housing, a cassette carrying unit which can be inserted or removed horizontally through the opening portion and in which cassettes can be loaded in a plurality of regions on a top surface, a horizontal motor for rotating a gear to be meshed with a rack of the cassette carrying unit to serve as a power source for moving the cassette carrying unit horizontally, pantograph mechanisms, provided in the respective regions of the cassette carrying unit, for moving horizontally loaded cassettes vertically, a pantograph driving mechanism, provided at a predetermined position in the housing, for driving the pantograph mechanism to vertically move a cassette support plate of the pantograph mechanism, and a vertical motor for applying a rotational force to a rotary member of the pantograph driving mechanism to serve as a power source of the pantograph mechanisms.

As described above, the independent motors are used as the driving source of the tray unit which moves horizontally and the driving source of the pantograph mechanism. Therefore, a motor having power which matches with the corresponding load characteristic can be used, and this improves the reliability in an operation.

It is still another object of the present invention to provide an apparatus which can load a plurality of cassettes and in which a lift mechanism for vertically moving a cassette from a tray-type cassette carrying unit can be constituted by a small number of components and a safety can be obtained during the conveyance and in an operation.

In order to achieve the above object, the present invention comprises a housing incorporating a tape driving section, an opening portion formed in a front wall of the housing, a cassette carrying unit which can be inserted or removed horizontally in a front-and-back direction through the opening and has bottom plates, and in which cassettes can be placed on the bottom plates, pantograph mechanisms, provided in the cassette carrying unit, for moving the bottom plates vertically, a locking member, mounted on the cassette carrying unit, for holding the bottom plate to wait at a position in a horizontal moving path of the cassette carrying unit via an intermediate member of the pantograph mechanism, and pantograph driving means, provided at a fixed position in the housing, for operating the pantograph mechanism of the cassette carrying unit to release the engagement between the locking member and the intermediate member and driving the pantograph mechanism to move the bottom plate downward when the cassette carrying unit moves to a predetermined position in a horizontal moving direction.

As described above, the pantograph mechanism capable of loading a plurality of cassettes is arranged in the carrying unit, and the pantograph driving mechanism is located at a fixed position to engage/disengage the intermediate member with/from the locking member. As a result, a mechanism for switching the conveyance direction of a cassette from horizontal movement to vertical movement (or vice versa) can be easily obtained with a simple arrangement, and this enables safe cassette conveyance.

BRIEF DESCRIPTION OF THE DRAWINGS

FIGS. 11A to 11C are views for explaining the arrangements of a pantograph driving mechanism and a cassette holding mechanism of the above VTR;

FIGS. 15A and 15B are views for explaining the arrangement of a pop-up mechanism of the above VTR;

FIG. 16 is a view for explaining an example of a system of a power source for the tray unit and the pantograph mechanism of the above VTR;

FIGS. 18A and 18B are views for explaining an example of a clicking mechanism according to the present invention;

FIGS. 19A and 19B are views for explaining an example of a tray position detecting mechanism according to the present invention;

FIGS. 24A and 24B are views for explaining other examples of the position data generating unit of the tray unit;

FIGS. 26A and 26B are views for explaining examples of the use of the tray unit of the above VTR;

FIGS. 28A and 28B are views for explaining still another embodiment of the present invention.

DETAILED DESCRIPTION OF THE PREFERRED EMBODIMENTS

Embodiments of the present invention will be described below with reference to the accompanying drawings.

Figure 1:
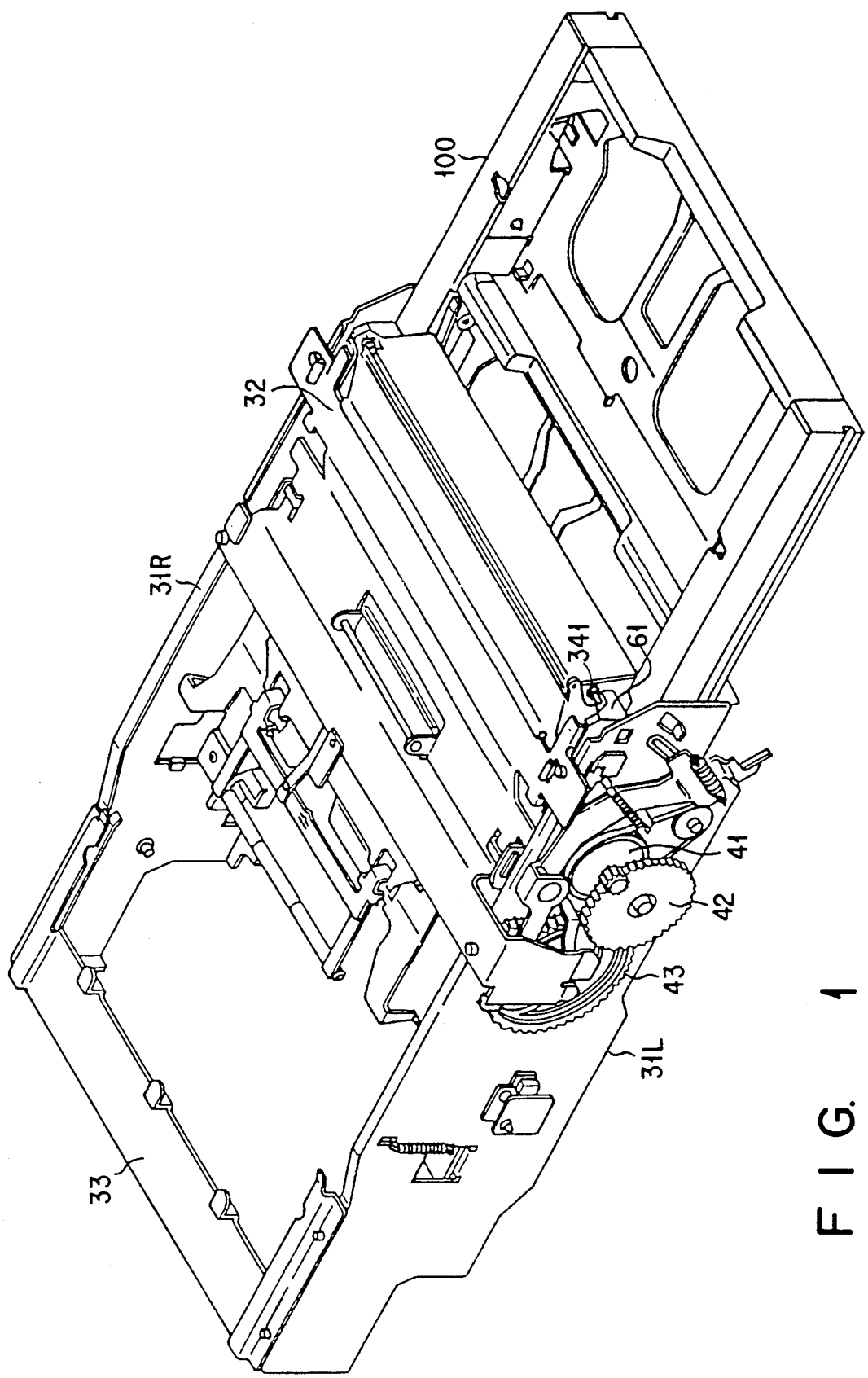
FIG. 1 is a perspective view showing an embodiment of the present invention viewed from the front left side.
Figure 2:
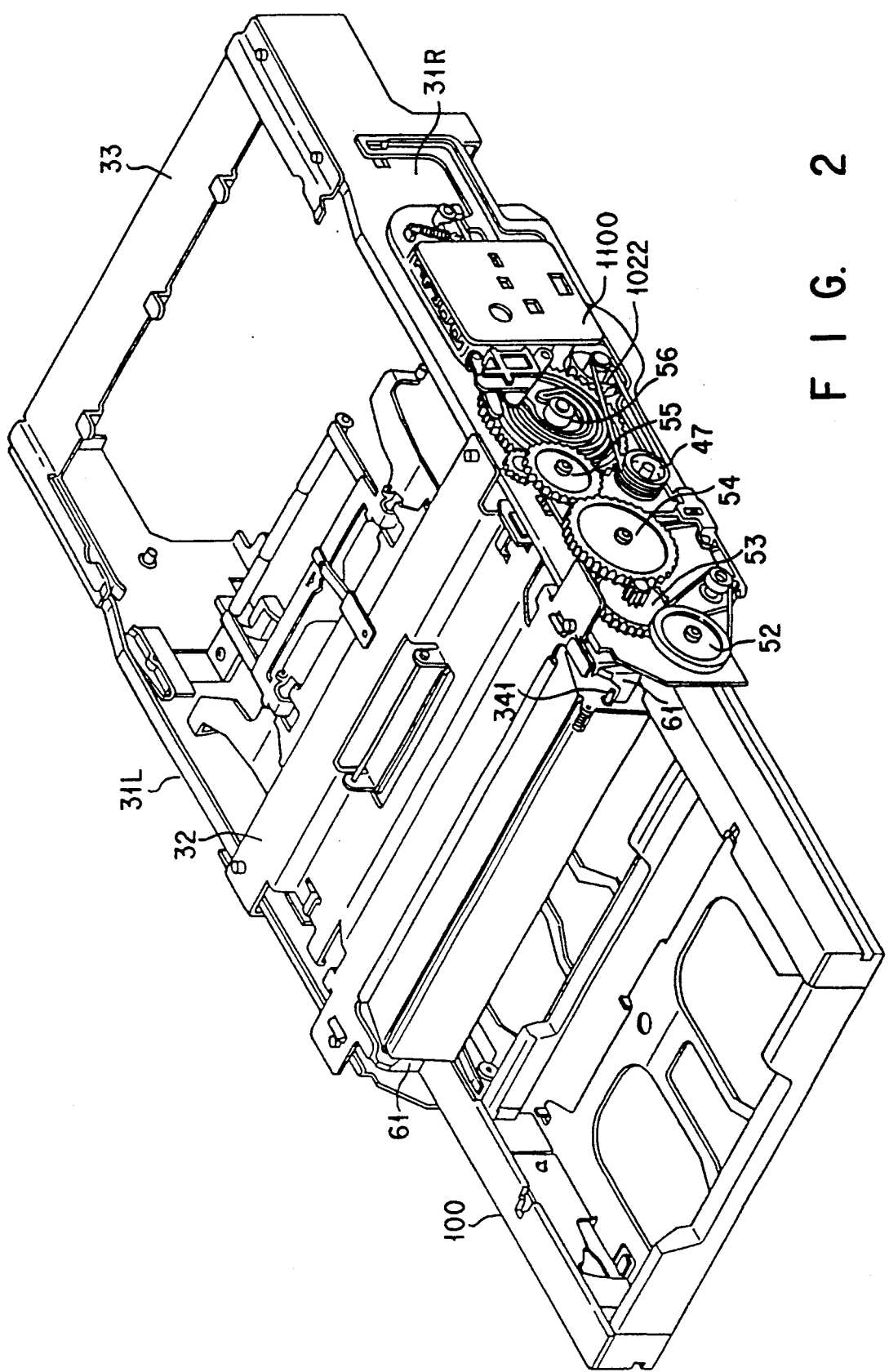
FIG. 2 is a perspective view showing the embodiment of the present invention viewed from the front right side.
Figure 3:
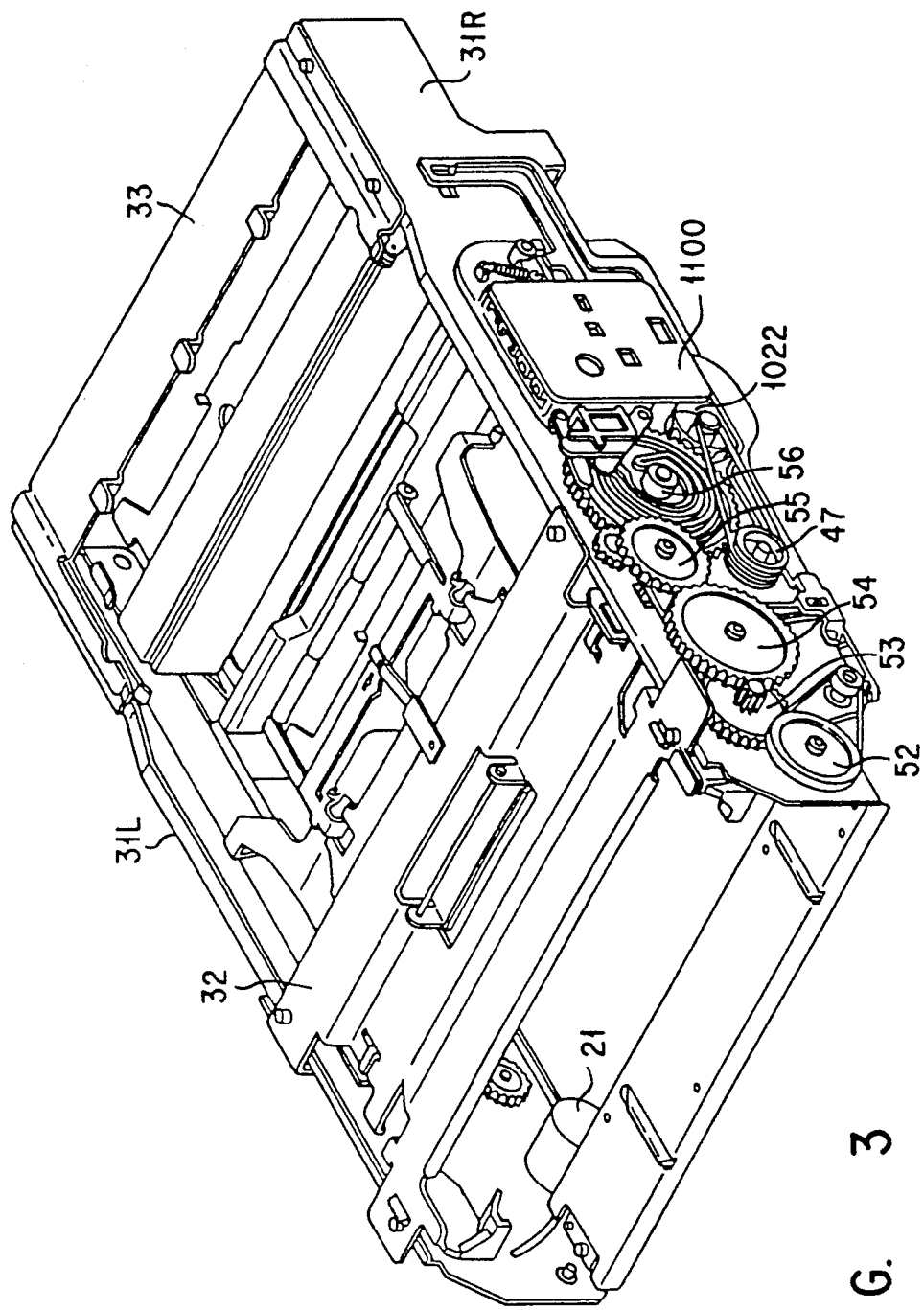
FIG. 3 is a perspective view showing another operation state of the embodiment of the present invention viewed from the front right side.
Figure 4:
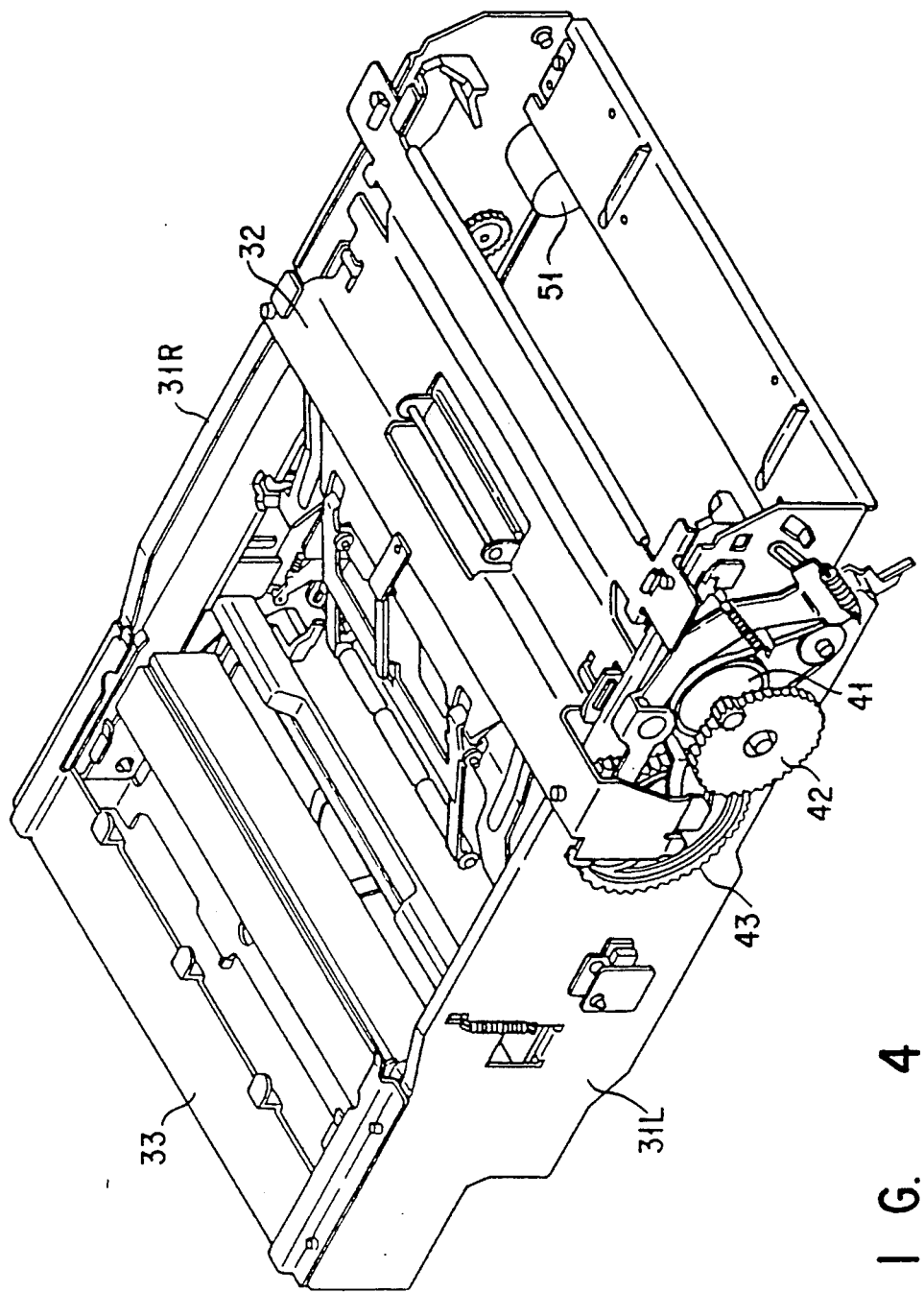
FIG. 4 is a perspective view showing still another operation state of the embodiment of the present invention viewed from the front left side.

FIGS. 1 to 5 show the outer appearance of a VTR according to the present invention, in which a chassis main body is pulled out from a housing. FIG. 1 is a left-side front view showing a state in which a tray unit 100 is pulled out maximally from the chassis main body. FIG. 2 is a right-side front view showing the same state (FIG. 1) in which the tray unit 100 is pulled out maximally from the chassis main body. FIGS. 3 and 4 are right- and left-side front views, respectively, showing a state in which the tray unit 100 is inserted to the deepest.

The chassis main body is constituted mainly by left and right side plates 31L and 31R, a plate 32 spanned across the upper front portions of the left and right side plates 31L and 31R, and a plate 33 spanned across their upper rear portions. The side plate 31L is equipped with a horizontal driving motor 21 (shown in FIG. 3) for driving the tray unit 100 back and forth, and gears 41 and 42 and a cam 43 (shown in FIGS. 1 and 4) for driving a member interlocked with the back-and-forth movement of the tray unit 100. A vertical driving motor 51 (shown in FIG. 4) for vertically moving a cassette placed on the tray unit 100 is mounted on the side plate 31R. The side plate 31R is also provided with gears 52, 53, 54, and 55 and a cam 56 (shown in FIGS. 2 and 3) for transmitting the rotation of the vertical driving motor 51 to individual components. A detailed horizontal movement of the tray unit 100 and a means for controlling the vertical movements of a cassette placed on the tray unit 100 will be described later.

Figure 5:
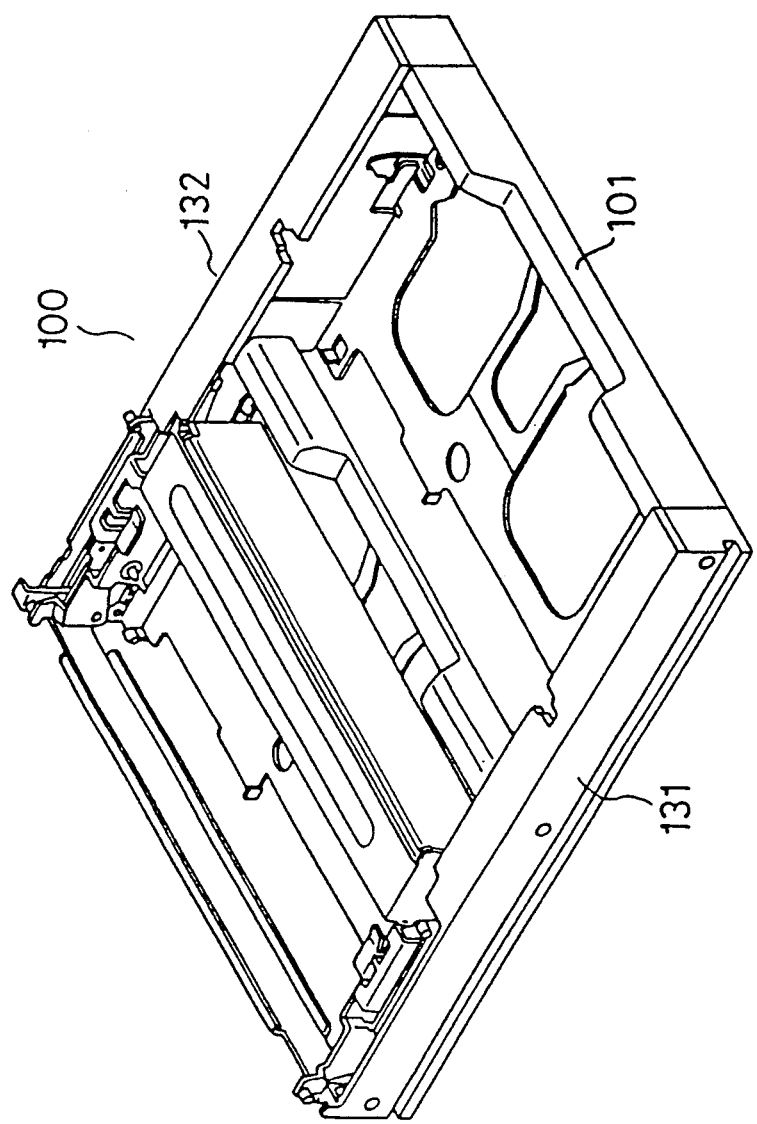
FIG. 5 is a perspective view showing a frame used in the embodiment of the present invention.

FIG. 5 shows the outer appearance of the tray unit 100. The tray unit 100 has a tray frame 101 which looks like a frame when viewed from the above. Rails formed outside the side plates of the tray frame are guided by rollers provided inside the side plates of the chassis to move the tray frame horizontally. A portion constituting each of left and right frames 131 and 132 of a frame 101 has an internal cavity which accommodates a link lever of a pantograph mechanism and the like as will be described later.

Figure 6A:
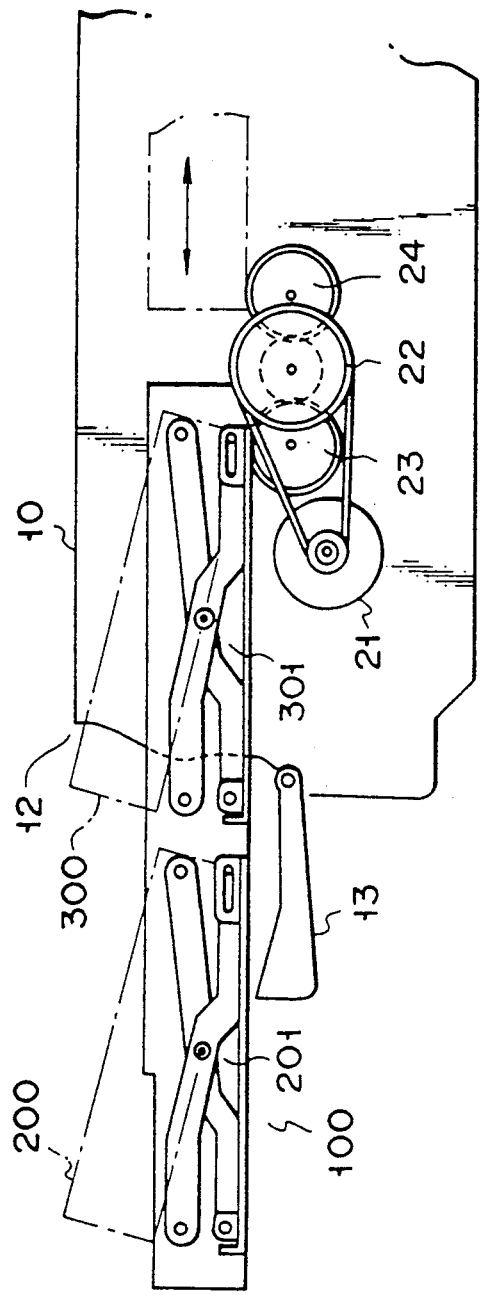
FIGS. 6A, 6B, and 6C are views showing the basic arrangement of a VTR according to the present invention, for explaining its first, second, and third operation modes.
Figure 6B:
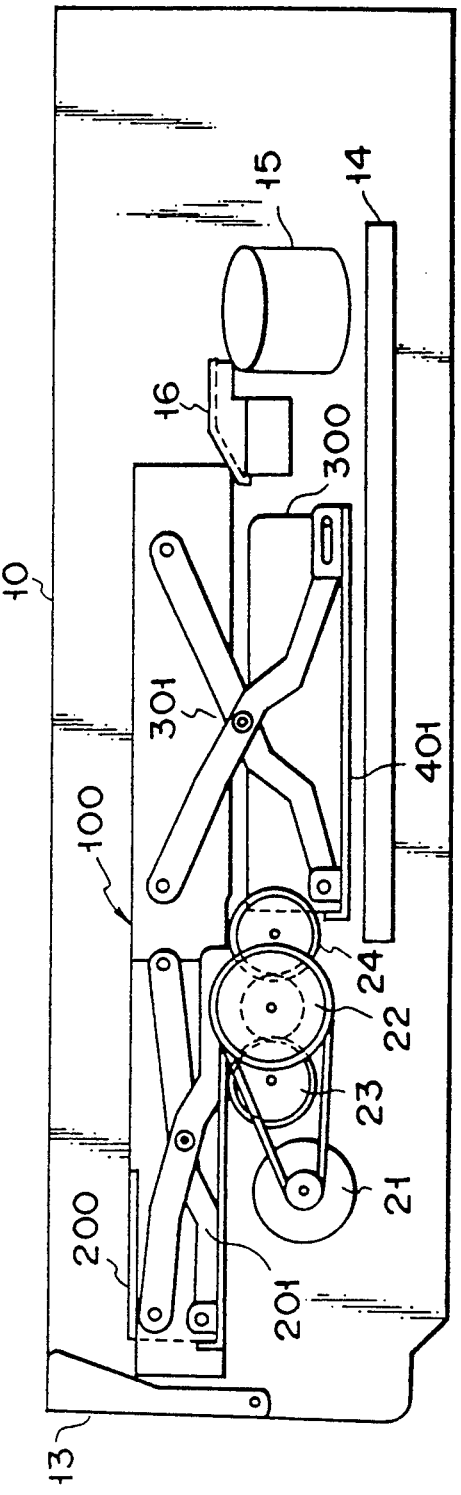
Figure 6C:
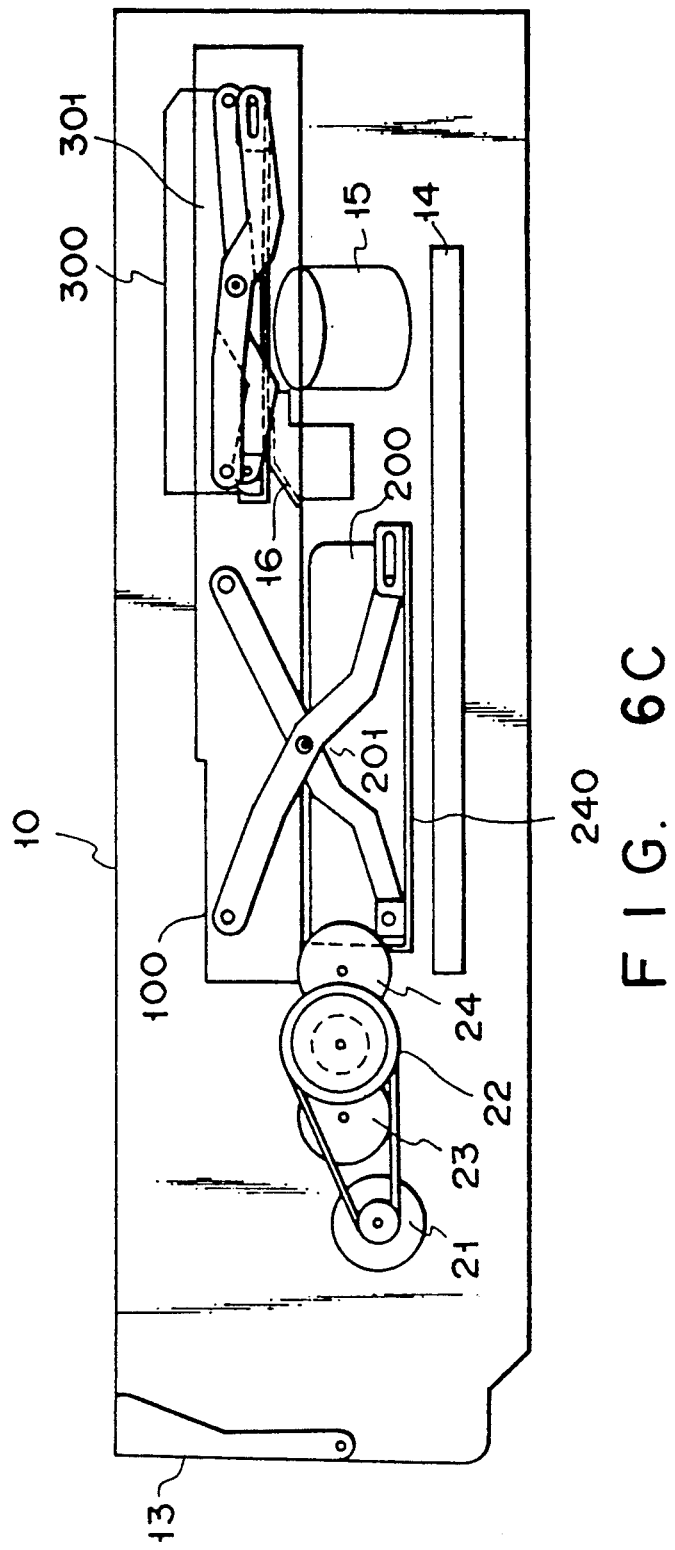

FIGS. 6A, 6B, and 6C are views for explaining the basic arrangement of cassette loading and unloading of the VTR according to the present invention. Reference numeral 10 denotes a VTR housing having an opening 12 formed in its front wall. The tray unit 100 can be inserted horizontally in the tray unit 100 or exposed from the inside of the housing 10 in the front-and-back direction through this opening 12. Note that reference numeral 13 denotes a cover provided for the opening 12. The cover 13 is open when the tray unit 100 is pulled out from the housing 10 and is closed after it is inserted into the housing 10. This opening/closing of the cover 13 is realized by a cover opening/closing mechanism interlocked with the tray unit 100, although not shown.

A motor 21 as a tray driving mechanism is provided at a fixed position in the housing 10 and rotates an intermediate gear 22. The intermediate gear 22 has a rotating shaft perpendicular to the front-and-back moving direction of the tray unit 100. The intermediate gear 22 can rotate driving gears 23 and 24 located rotatably before and behind it. The driving gears 23 and 24 can mesh with a rack formed on the lower surface of the side portion of the tray unit 100 and drive the tray unit 100 back and forth. This VTR also incorporates a function of placing a cassette in a predetermined position to execute tape loading. Reference numeral 14 denotes a main chassis including a reel shaft which engages with a reel hub of a cassette and various components (not shown) required for tape loading and driving; and 15, a rotary head drum with which a tape extracted from a cassette placed on the predetermined loading position is brought into contact upon tape loading. FIGS. 6A, 6B, and 6C show a state in which the front driving gear 23 meshes with the rack, a state in which both the front and rear driving gears 23 and 24 mesh with the rack, and a state in which the rear driving gear 24 meshes with the rack, respectively.

The tray unit 100 has a tray frame 101 which looks like a frame when viewed from the above. Rails formed outside the side plates of the tray frame are guided by rollers provided inside the housing to move the tray frame horizontally.

In this system, two cassettes 200 and 300 can be arranged in front and back regions on the upper surface of the tray unit 100 (FIG. 6A). Pantograph mechanisms 201 and 301 are mounted on the front and back regions of the tray unit 100. The pantograph mechanisms 201 and 301 have the same structure and each can move a cassette bottom support plates 240 and 401 vertically by means of a link mechanism.

FIG. 6A shows a state in which the cassettes 200 and 300 are placed in the front and back regions. Each of the cassettes 200 and 300 directs its front end portion toward an obliquely upper position because this front end portion is lifted by a pop-up mechanism provided in the tray unit 100 to facilitate insertion and removal of the cassette. In addition, the rear cassette 300 can be removed without pulling out the tray unit 100 largely from the opening of the housing 10. That is, the front cassette 200 is entirely exposed, whereas only a portion (distal end portion) of the rear cassette 300 is exposed from the opening. With this design, the tray unit 100 need only be pulled by a short distance, and this decreases the surrounding space occupied by the system for handling it.

FIG. 6B shows a state in which the rear pantograph mechanism 301 loads the cassette 300 in a tape loading position below a portion where the tray passes. FIG. 6C shows a state in which the front pantograph mechanism 201 moves the cassette 200 downward to load it in a predetermined tape loading position. To transit from the state shown in FIG. 6A to the state shown in FIG. 6B, the tray driving mechanism operates to horizontally move the tray unit 100 inside the housing 10. Upon arriving at a first detection position (rear cassette driving position), the tray unit 100 is stopped. At this position, a pantograph driving mechanism (to be described later) operates to drive the pantograph mechanism 301, thereby moving the cassette 300 downward. To transit from the state shown in FIG. 6B to the state shown in FIG. 6C, the pantograph driving mechanism drives the pantograph mechanism so as to lift the cassette 300 from the lower position and return it to its original position in the tray unit 100. Subsequently, the tray driving mechanism further moves the tray unit 100 inward and stops the movement of the tray unit 100 when the tray unit 100 reaches a position above a cassette loading position, i.e., a second detection position (front cassette driving position). Again, the pantograph drive mechanism drives this time the pantograph mechanism 201 to move the cassette 200 down to a predetermined position.

In the state shown in FIG. 6C, the pantograph mechanism 301 which mounts the rear cassette 300 is located immediately above the rotary head drum 15. At this position, the pantograph mechanism 301 is guided in a direction along which it is floated slightly from the tray unit 100, thereby preventing collision of the cassette 300 and the pantograph mechanism 301 against the rotary head drum 15. A member which lifts the pantograph mechanism 301 is a guide member 16 projecting from the inner side surface of the housing 10. That is, when the tray unit 100 further moves inward from the state shown in FIG. 6A with the cassette 300 being lifted, the cassette bottom support plate 401 of the pantograph mechanism 301 rides on the inclined surface of the guide member 16. The cassette 300 or the pantograph mechanism is lifted slightly at the standby position of the cassette 300 because if the height of the housing 10 is decreased for a low-profile arrangement, the locus of movement of the tray unit 100 crosses the upper portion of the rotary head drum 15. This arrangement also reduces a temperature rise by improving ventilation around the rotary head drum 15 and improves the safety of a cassette tape.

Figure 7:
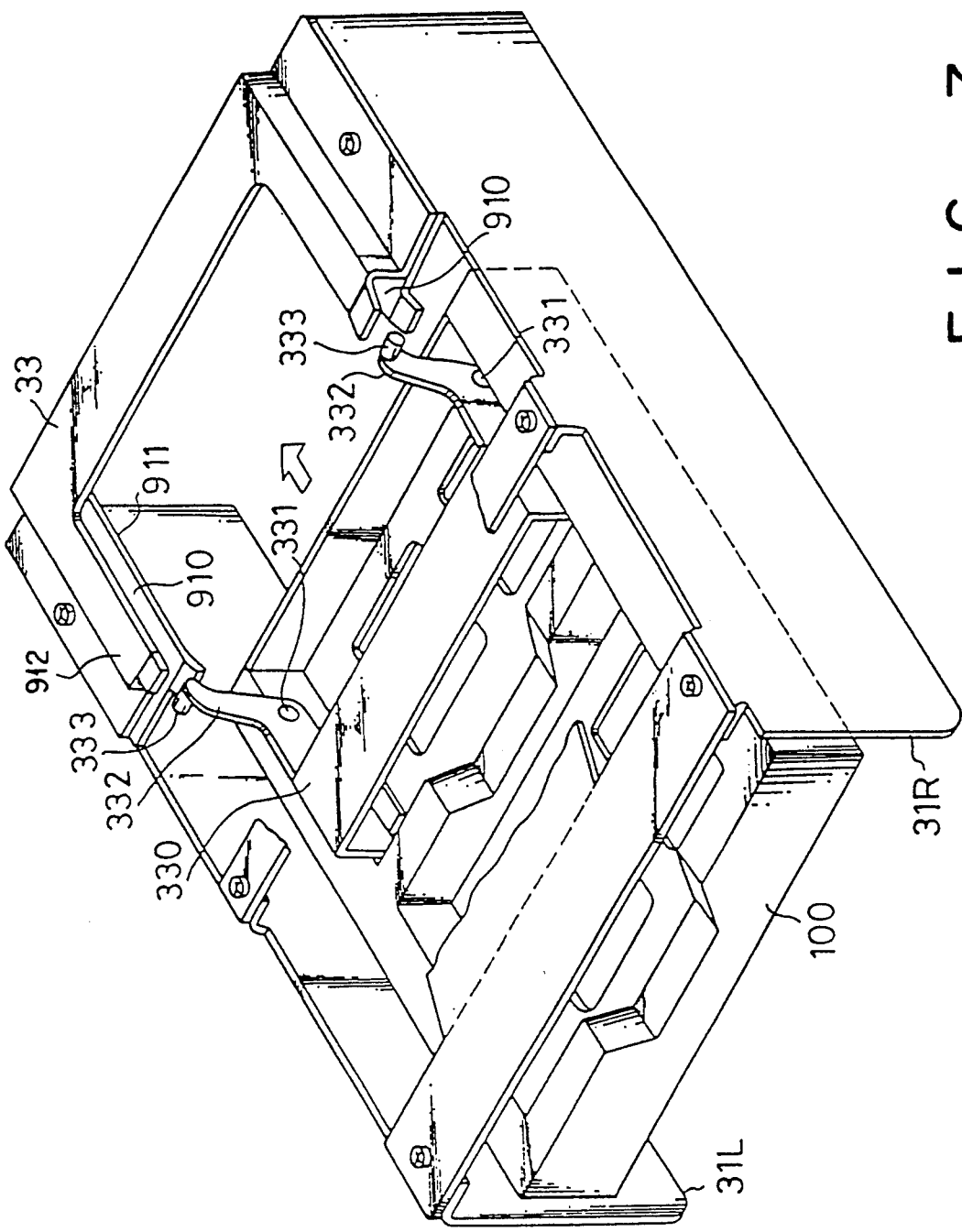
FIG. 7 is a view for explaining a fixing mechanism at a standby position of a pop-up member of the above VTR.

FIG. 7 shows a state in which the tray unit 100 is inserted to a position where the back region opposes a tape driving section provided at a predetermined position below the back region. From this state, the cassette can be moved down to be placed in the tape driving section, as shown in FIG. 6B. Alternatively, as shown in FIG. 6C, the tray unit 100 can be further moved inward to locate the back region above the rotary head drum 15, thereby causing the front region to oppose the tape driving section. When the tray unit 100 is inserted deeper from the state shown in FIG. 7, pin-like distal end portions 333 of levers 332 provided at the rear end portion of a pop-up member 330 mounted on the back region are received and guided by horizontal grooves 910 formed in a the plate 33. Each groove 910 is formed by a guide plate 911 projecting inside the plate 33 and a cover plate 912 arranged parallel to the guide plate 911 with a predetermined interval therebetween. The entrance of the groove 910 is formed widely so that the distal end portion 333 can easily enter.

Although the pop-up operation of the pop-up member 330 will be described later, the pop-up member 330 is mounted on the back region of the tray unit 100 by a shaft 331 such that its front free end can pivot vertically in order to facilitate loading and unloading of a cassette when the tray unit 100 is pulled out. When the tray unit 100 is pulled out maximally, this pop-up member 330 operates to raise its front open side. When the tray unit 100 is inserted into the housing, the pop-up member 330 operates such that the front open end is set parallel to the tray unit 100. As shown in FIG. 7, the levers 332 and the pin-like distal end portions 333 are provided horizontally symmetrically on the left and right sides and therefore denoted by the same reference numerals, respectively. This similarly applies to the grooves 910. The distal end portions 333 of the pop-up member 330 are used as locking means when the pop-up member 330 is in a retraction position, and can also function as components for the pop-up operation; that is, the pop-up member 330 is used for multiple purposes.

From the comparison between the states shown in FIGS. 6A and 6C, the following design of this system will be understood. That is, the tray unit 100 is pulled out most in the state of FIG. 6A and is inserted deepest in the state of FIG. 6C. A rack provided on the edge of the lower surface of the tray unit 100 meshes with the gears 23 and 24 to move the tray unit 100 back and forth. In this case, the two gears 23 and 24 are aligned along the moving direction of the tray and interlocked through the intermediate gear 22 such that only the gear 23 meshes with the rack in the state shown in FIG. 6A, whereas only the gear 24 meshes with it in the state shown in FIG. 6C. With this arrangement of the gears 23 and 24, it is possible to decrease the total length of the tray unit 100 in the front-and-back direction. If it is attempted to realize the driving gear mechanism of the tray unit 100 with only a single gear, the total length of the tray unit 100 becomes inevitably larger than that in this embodiment since the single gear must mesh with the rack in both the states of FIGS. 6A and 6C.

This miniaturization of the tray unit 100 in its total length reduces the load on the driving unit by decreasing the weight of the tray unit. This small total length can also narrow the space into which the tray unit 100 projects upon cassette loading and in this way can decrease the surrounding space occupied by the system. In other words, the stroke of movement of the tray unit 100 can be increased even with the small total length of the tray unit.

Figure 8A:
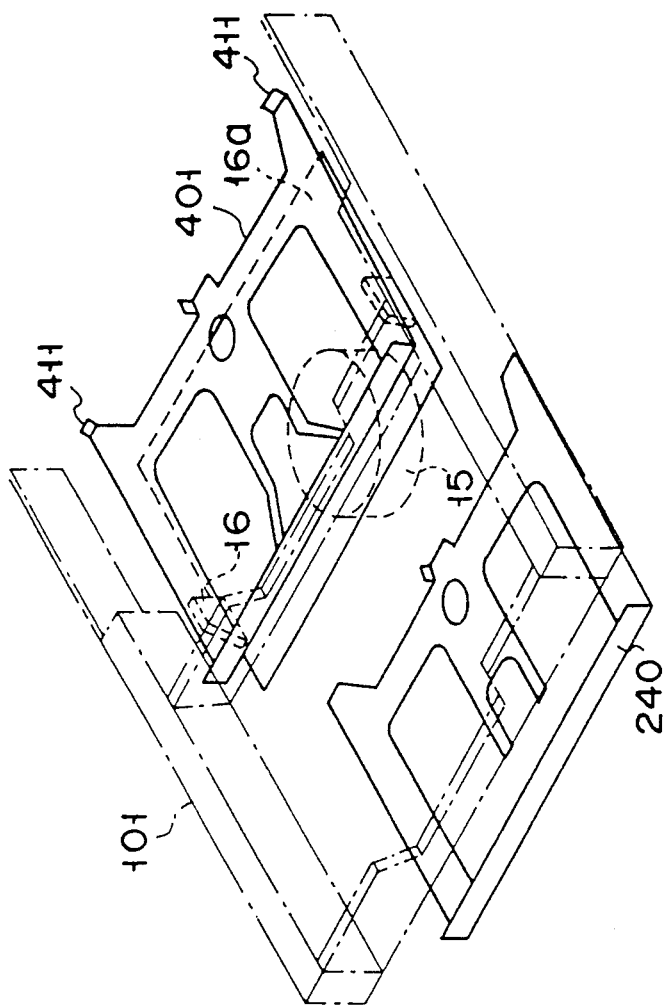
FIGS. 8A and 8B are views for explaining a standby position of a pantograph mechanism.
Figure 8B:
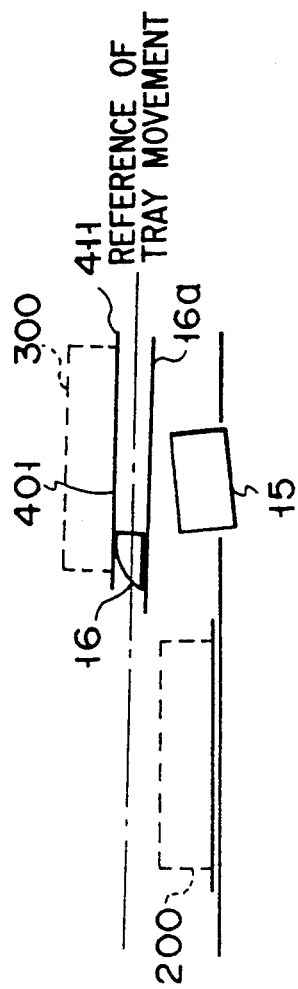

FIGS. 8A and 8B show a state in which the cassette 300 in the back region is retracted when the cassette 200 in the front region is placed in a predetermined loading position. In this system, the pantograph mechanism can move a cassette upward further from a home position as well as move it down. Therefore, when the tray moves to the retraction position, the cassette 300 and the pantograph mechanism 301 are raised by the guide member 16 so as not to collide against the rotary head drum 15. As a result, even when the height of the housing 10 is decreased for a low-profile arrangement of the entire system, no component collides against the rotary head drum 15. In addition, ventilation around the drum is improved to decrease the temperature rise, and the safety of a cassette tape is also improved.

Furthermore, when a metal plate 16a s arranged below a cassette bottom support plate 401 or above the rotary head drum 15, a magnetic shield is formed to prevent the magnetism of the rotary head drum from adversely affecting a cassette tape. As a result, the safety of a cassette can be further improved. In addition, inclined portions 411 are formed in the rear end portion of the cassette bottom support plate 401 so that the plate 401 can easily ride on the guide member 16.

Figure 9A:
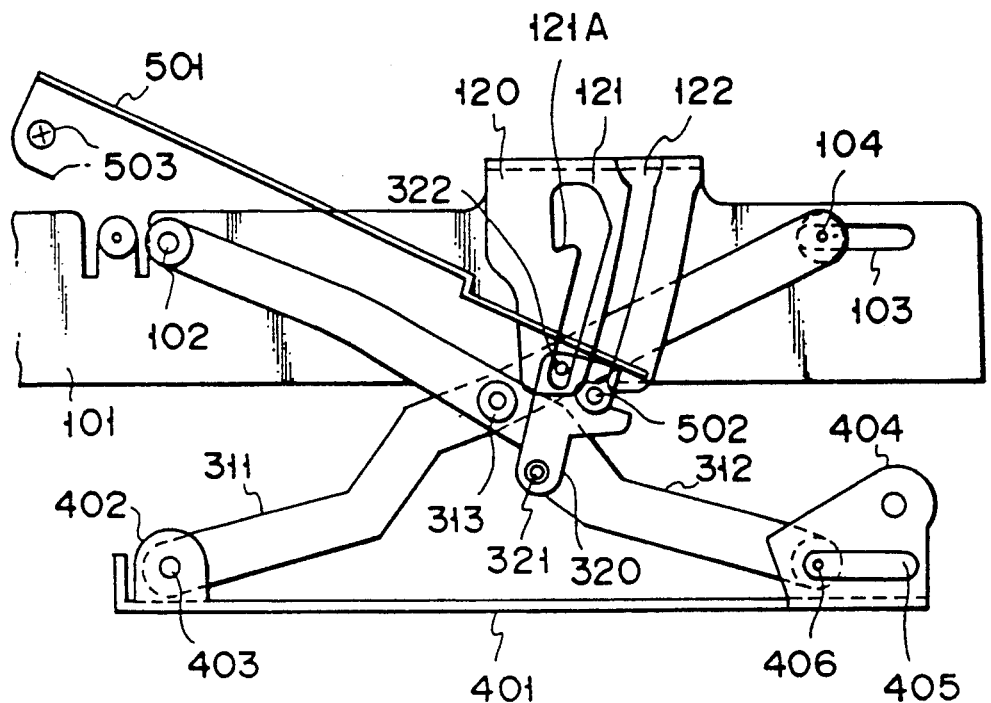
FIGS. 9A and 9B are views for explaining the arrangement of the pantograph mechanism of the above VTR.
Figure 9B:
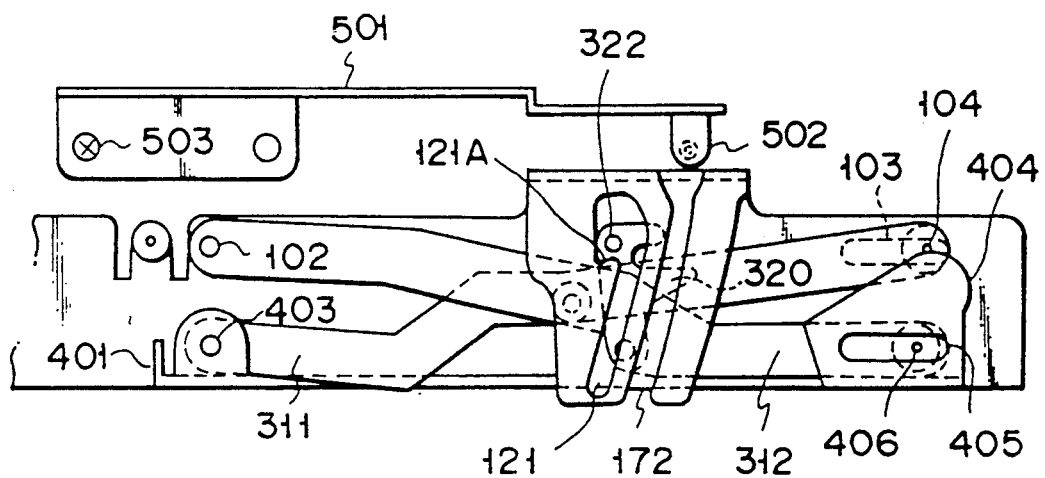

FIGS. 9A and 9B show the pantograph mechanism 301 together with its pantograph driving mechanism.

Although various modifications of the pantograph mechanism 301 are possible, the pantograph mechanism 301 of this system has a basic arrangement in which first and second link levers 311 and 312 are arranged to cross each other like an x mark when viewed from the side surface. The crossing portions of the link levers 311 and 312 are coupled by a shaft 313. This enables the link levers 311 and 312 to move their respective two end portions apart from (rise) or close to (fall) each other as shown in FIGS. 9A and 9B, respectively. The front end portions of the link levers 312 and 311 are pivotally mounted on a frame 101 of the tray unit 100 and on a mounting portion 402 of a cassette bottom support plate 401 through shafts 102 and 403, respectively. The rear end portion of the link lever 311 is engaged with an elongated hole 103 formed in the frame 101 through a pin 104. The rear end portion of the link lever 312 is engaged with an elongated hole 405 formed in a mounting portion 404 of the cassette bottom support plate 401 through a pin 406. With this arrangement, the link mechanism can move the cassette bottom support plate 401 to the upper or lower position.

The pantograph driving mechanism for driving the pantograph mechanism 301 will be described below.

The pantograph driving mechanism has a pivotal member 501 for pushing down or pulling up an intermediate cam 320 which is pivotally provided on the link lever 312. The intermediate cam 320 is pivotally mounted in the middle of the link lever 312 by a shaft 321 and moves vertically in accordance with the movement of the link lever 312. In this case, an engagement pin 322 is provided in the intermediate cam 320. This engagement pin 322 engages with a hole 121 of a guide plate 120 attached to the frame 101 at a predetermined interval therebetween. This hole 121 is like a groove and has a locking function of locking the rise position of the pantograph mechanism and a regulating function of regulating the locus of vertical movements of the pantograph mechanism and the lower position of the mechanism. That is, since the engagement pin 322 of the intermediate cam 320 moves along the hole 121, the locus upon vertical movements is regulated, and the lower position is determined by the lower end portion of the hole 121. Upon rising, the engagement pin 322 engages with a locking portion 121A formed as a stepwise recess in the hole 121 to prevent an unexpected downward movement of the pantograph mechanism.

A guide groove 122 is further formed in the guide plate 120 in parallel with the hole 121. This guide groove 122 is so formed as to notch the guide plate 120 at its upper and lower end portions. The pivoting distal end of the intermediate cam 320 is located to overlap and cross the guide groove 122. Since the guide groove 122 is cut away in the vertical direction, a roller 502 provided at the distal end of the pivotal member 501 can pass through this groove. The roller 502 faces the guide groove 122 from the above on the drawing surface.

The pivotal member 501 is pivotally mounted by a shaft 503 at a fixed position (above the path through which the tray unit 100 passes) inside the housing, and its pivoting distal end can move vertically along the guide groove 122. FIG. 9B shows a state before the pantograph driving mechanism operates, in which the roller 502 is located in an upper portion of the entrance of the guide groove 122. When a position detecting means of the tray unit 100 outputs position detection data, the pivotal member 501 is driven to pivot about the shaft 503 by a driving means (not shown). In this state, the roller 502 enters the guide groove 122. When the roller 502 abuts against the pivoting end portion of the intermediate cam 320, the intermediate cam 320 slightly pivots clockwise. For this reason, the engagement pin 322 of the intermediate cam 320 can be released from the locking portion 121A and can move downward along the hole 121. Therefore, the pivotal member 501 continuously pivots to the state shown in FIG. 9A. With this pivotal motion, the cassette bottom support plate 401 supported by the pantograph mechanism moves downward to load a cassette in a predetermined loading position. At this time, the position of the engagement pin 322 of the intermediate cam 320 is regulated by the hole 121, and this consequently determines the position the cassette. At the same time, the roller 502 of the pivotal part 501 engages with the U-shaped groove of the intermediate cam 320. Therefore, the pantograph mechanism is locked at that position. In addition, an elastic holding member which rotates with the shaft 503 of the pivotal member 501 holds the right and left central portions of the cassette from the above.

FIG. 9A shows a state in which the cassette bottom support plate 401 is at its lower position. In order to move from this lower position to an upper position, the pivotal member 501 is pivoted counterclockwise by a driving means (not shown). Since the roller 502 engages with the U-shaped recess of the intermediate cam 320, it pulls up the intermediate cam 320. With this movement, the link mechanism operates to raise the cassette bottom support plate 401. Immediately before the intermediate cam 320 is set in the state shown in FIG. 9B, the roller 502 pushes the intermediate cam 320 counterclockwise. As a result, the engagement pin 322 of the intermediate cam 320 moves to the locking portion 121A. Therefore, when the cassette bottom support plate 401 rises to the same level as the tray unit 100, the link mechanism does not unexpectedly move down.

FIGS. 9A and 9B illustrate the pantograph mechanism and its driving mechanism on the left side of the opening. However, the similar mechanisms are also provided on the right side, and these left and right mechanisms operate in synchronism with each other.

The pantograph driving mechanism will be described in more detail below.

Figure 10:
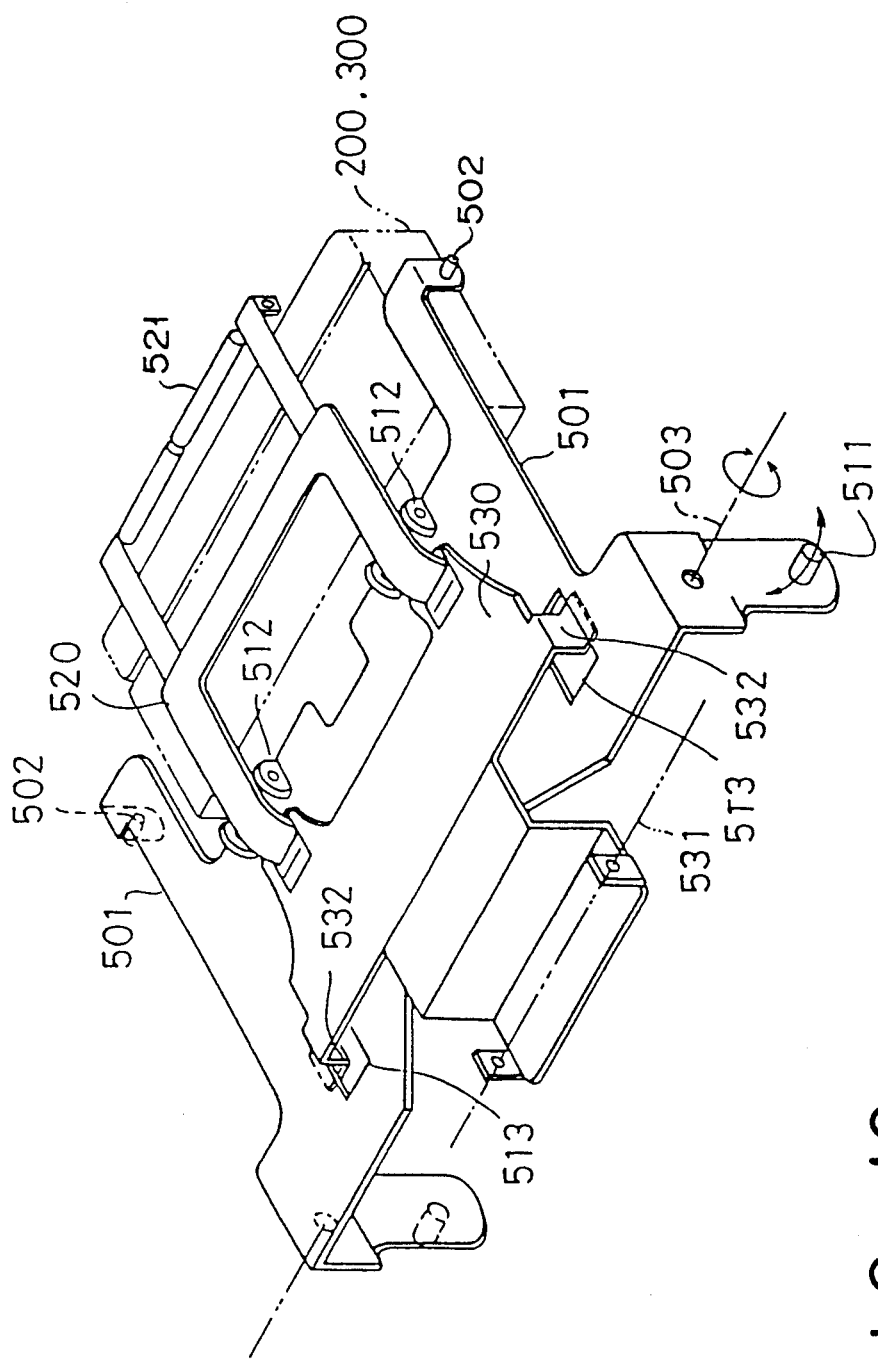
FIG. 10 is a view for explaining the arrangements of a pantograph driving mechanism and a cassette holding mechanism of the above VTR.

FIG. 10 shows the relationship between the pantograph driving mechanism and a cassette holding mechanism. As described above, the pivotal member 501 pivots about the shaft 503. The power for pivoting this component is transmitted when a vertical control cam (not shown) drives a pin 511. This vertical control cam is mounted on the side portion of the chassis inside the housing and is driven by a vertical motor (not shown).

A cassette holding member 520 is mounted on the upper surface of the pivotal member 501 so as to pivot about shafts 512. The pivoting distal end of the cassette holding member 520 extends longer than the distal end of the pivotal member 501 in the same direction. The proximal end portion of the cassette holding member 520 engages with the pivoting distal end of a control plate 530. The proximal end portion of the control plate 530 is supported pivotally by a shaft 531 which is attached to a fixed position of the chassis inside the housing. The pivoting distal end portion of the control plate 530 is arranged on the upper surface side of the pivotal member 501, and locking portions 532 are formed in this portion. These locking portions 532 engage with holes 513 formed in the pivotal member 501.

As the pivotal member 501 drives the pantograph mechanism, the cassette holding member 520 pivots about the shafts 512, and rollers 521 provided at the distal end of the cassette holding member 520 hold the cassette 200 or 300.

FIGS. 11A to 11C are views for explaining the operation of the above mechanism. FIGS. 11A, 11B, and 11C illustrate a state obtained before a cassette is held, a state obtained while the cassette is held, and a state obtained after the cassette is completely held in the cassette driving position, respectively. As shown in FIGS. 11A to 11C, since the pivot center of the pivotal member 501 is different from that of the control plate 530, an interval M between the pivoting distal ends of the two components is increased as the pivotal member 501 pivots. This causes the distal end of the control plate 530 to relatively pivot the proximal end portion of the cassette holding member 520 clockwise about the shafts 512. As a result, the pivotal speed of the pivoting distal end of the cassette holding member 520 becomes higher than that of the pivoting distal end of the pivotal member 501 to make it possible to hold a cassette more strongly. The distal end portion of the cassette holding member 520 is constituted by elastic leaf springs with the rollers 521 for holding a cassette at their distal ends.

Figure 12:
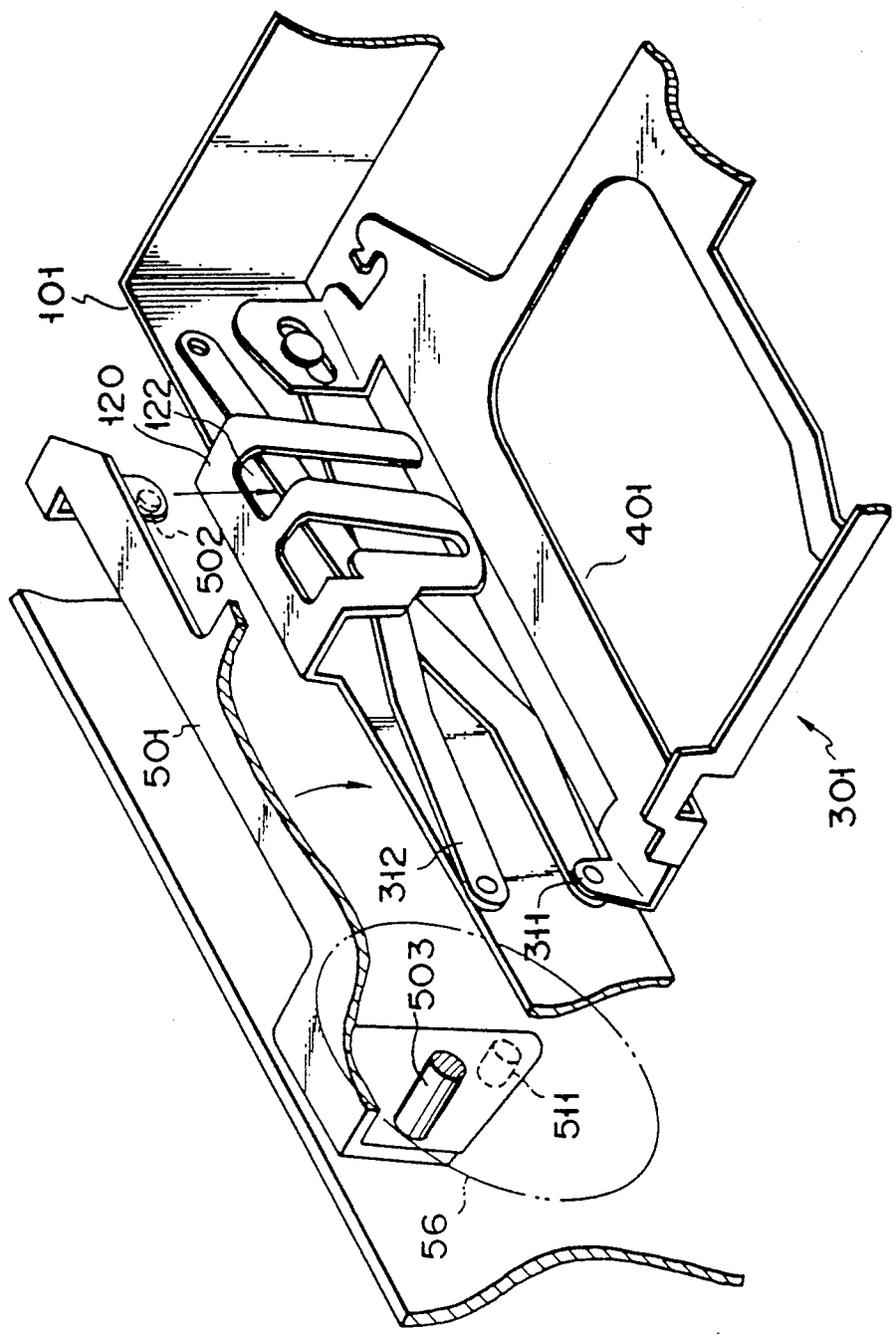
FIG. 12 is a perspective view showing a part of the above pantograph mechanism in detail.

FIG. 12 shows the relationship between the pantograph mechanism 301 and the pivotal member 501 and the like constituting its driving mechanism. The intermediate cam 320 provided to the link lever 312 is omitted. A roller 502 of the pivotal member 501 can enter the guide groove 122 of the guide plate 120. The pivotal member 501 is mounted on a fixed portion inside the housing, i.e., the side plate 31L by the shaft 503. A pin 511 of the pivotal member 501 engages with an inner cam groove of the cam 56 rotatably provided outside the side plate 31L. With this arrangement, the above operation can be obtained when the cam 56 is rotated.

Figure 13:
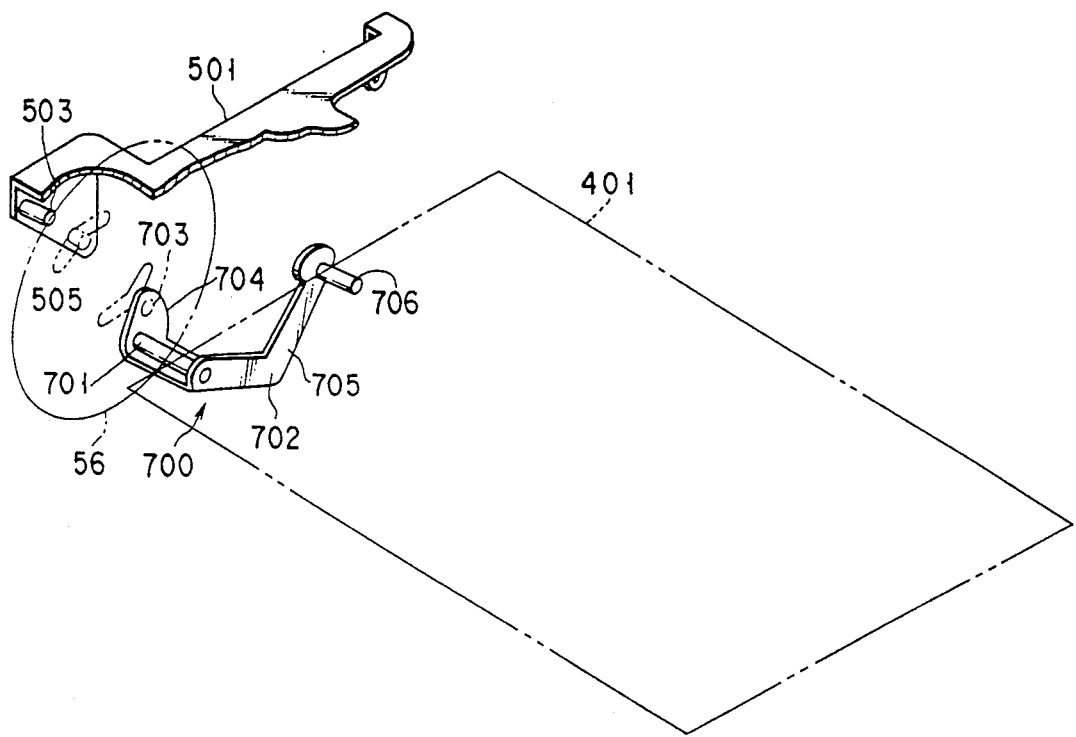
FIG. 13 is a view for explaining the operation of the above pantograph driving mechanism.

FIG. 13 shows the relationship between the pivotal member 501, the cassette bottom support plate 401, and a landing mechanism for performing landing control when the pantograph mechanism moves down. A landing mechanism 700 is mounted on the side plate 31L and has a shaft 701 extending inward the system and a pivotal lever 702 pivotally fitted on the shaft 701. The pivotal lever 702 has levers 704 and 705 which are arranged oppositely, the intermediate portion between the levers 704 and 705 extends along the shaft 701. The pivotal lever 704 has a pin 703 which engages with the cam groove of the cam 56 through an elongated hole of the plate 31L. The other lever 705 of the pivotal lever 702 is located at a middle position in the front-and-back direction of the cassette bottom support plate 401 and extends toward the place from the below. A pin 706 provided at the distal end portion of the lever 705 can support the side edge portion of the cassette bottom support plate 401. When the cam 56 is rotated to pivot the pivotal member 501, the pivotal lever 702 is also pivoted with the pivotal member 501 to allow the downward movement of the cassette bottom support plate 401.

Figure 14A:
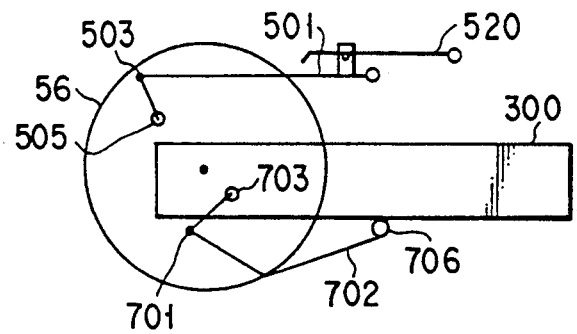
FIGS. 14A to 14E are views showing the principle for explaining the cassette conveyance operation performed by the above pantograph driving mechanism.
Figure 14B:
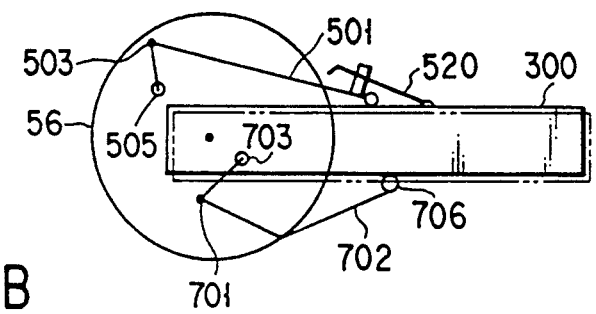
Figure 14C:
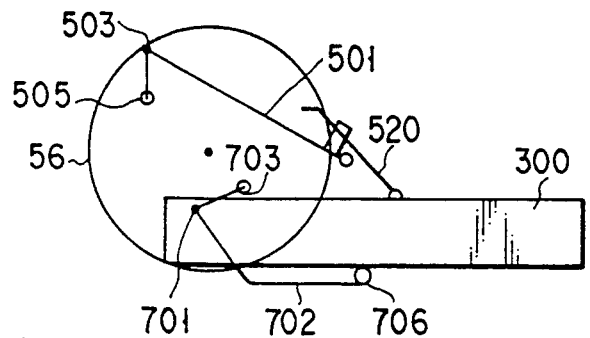
Figure 14D:
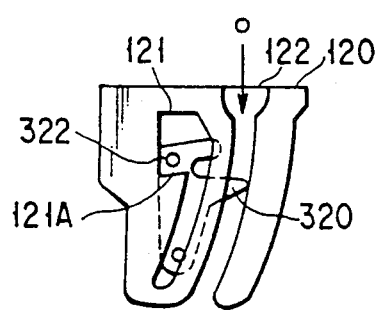
Figure 14E:
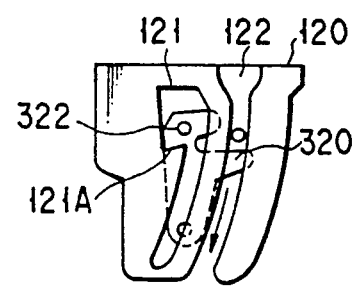

FIGS. 14A to 14E show the states of the pivotal member 501 and the pivotal lever 702 which operate in association with the cam 56 and the state of the intermediate cam 320 which acts on the guide plate 120. FIG. 14A shows a state in which the tray unit 100 mounting the cassette 300 moves horizontally to a predetermined position. When the cam 56 is rotated in this state, the pivotal member 501 starts driving the pantograph mechanism. When the state changes to that shown in FIG. 14B, the pivotal lever 702 operates to slightly raise the cassette bottom support plate 401 on which the cassette 300 is placed. This is executed by controlling the pin 703 of the pivotal lever 702 by the cam groove of the cam 56. The reason why the cassette bottom support plate 401 is slightly raised is that since the locking state between the engagement pin 322 and the locking portion 121A of the hole 121 is released, the intermediate cam 320 moves down smoothly when pushed downward by the pivotal member 501, as shown in FIGS. 14D and 14E.

FIG. 14C shows a state in which the cassette bottom support plate 401 is finally loaded in the tape driving section. When the cam 56 is rotated reversely, the pantograph mechanism starts rising to the state shown in FIG. 14A through that shown in FIG. 14B. At this time, the intermediate cam 320 is locked by the locking portion 121A, as shown in FIG. 14D. Consequently, the pantograph mechanism is stably held in a standby state on the level of the tray frame 101.

When the cassette bottom support plate 401 is loaded in the tape driving section as shown in FIG. 14C, the cassette holding member 520 holds the cassette to improve its stability as described above with reference to FIGS. 10 to 11C. That is, when a cassette is placed on a reel table, it is pushed upward by a reaction force of the reel table. The cassette holding member 520 pushes the cassette downward against this repulsion, thereby improving the stability.

FIGS. 15A and 15B show the pop-up mechanism for facilitating handling of the cassette 200 or 300 from the outside when the tray unit 100 is pulled out from the housing 10. When the tray unit 100 is kept pulled out from the housing 10, the front and rear cassettes 200 and 300 are set parallel with each other by the pop-up mechanism with their front ends being inclined upward. The arrangement is designed such that the rear cassette 300 is inserted in a pop-up member 330 in the back region with its bottom surface sliding on the top surface of the front cassette 200.

FIG. 15A shows a state in which a pop-up member 230 in the front region and the rear pop-up member 330 lift the respective cassettes 200 and 300.

The front pop-up mechanism will be described below.

The pop-up member 230 has a shaft 231 about which the front-side pivoting end freely pivots in the vertical direction. A support portion 232 is formed at the front-side pivoting end. This support portion 232 can lift the bottom portion of the cassette 200. Although not shown, the shaft 231 is mounted on the left side plate of the left and right side plates of the cassette bottom support plate 240. Therefore, when the cassette bottom support plate 240 is moved down by the pantograph mechanism 201 as described above, the shaft 231 can move down together with the plate 240.

A slider 260 is arranged on the inner wall of the frame 101. The slider 260 can move with respect to the frame 101 in the same direction as the moving direction of the frame 101. Elongated holes 261 and 262 of the slider 260 engage with pins 111 and 112 projecting from the inner wall of the frame 101. The slider 260 also has a notched portion 264 at a position corresponding to the pop-up member 230. This notched portion 264 communicates with the elongated hole 261 and has an inclined portion. It is possible to insert a pin 233 on the pop-up member 230 into the elongated hole 261 through this notched portion 264. This is required to move the pop-up member 230 downward and return it to its original position together with the cassette bottom support plate 240 when the plate 240 is moved down by the pantograph mechanism.

When the tray unit 100 is inserted into the housing 10, the state is changed from FIG. 15A to 15B, and the front cassette 200 is set parallel to the tray unit 100 by the pivotal motion of the pop-up member 230. That is, when the tray unit 100 further moves inward from the state shown in FIG. 15B, the pins 111 and 112 and the pop-up member 230 together move backward (relatively, the slider 260 moves forward). Therefore, the pin 233 abuts against the corner of the notched portion 264, i.e., there is no portion for supporting the pin 233 from the below. In this state, the slider 260 and the frame 101 move together backward. Since the pop-up member 230 has the notched portion 264 (which is connected to the end portion of the elongated hole 261 and has an L shape to open downward), its pivoting distal end pivots downward to place the cassette 200 on the cassette bottom support plate 240.

Conversely, when the tray unit 100 is pulled out from the inside, the frame 101, the slider 260, and the pop-up member 230 move together forward. During this movement, however, the slider 260 is stopped by a stopper 18 provided at a fixed position inside the housing and therefore no longer moves forward. When the frame 101 further moves forward from this state, the slider 260 relatively moves backward, and the pin 233 of the pop-up member 230 is guided by the inclined portion of the notched portion 264 to enter the elongated hole 261. This operation directs the pivoting distal end of the pop-up member 230 upward, and the result is the state shown in FIG. 15B.

The pop-up mechanism for driving the rear pop-up member 330 and the operation of the mechanism will be described below.

The pop-up member 330 has an opening through which the cassette 300 can be inserted from the front. The back portion of the pop-up member 330 is pivotally supported by a shaft 331 so that the front portion of the member can pivot vertically. Although not shown, the shaft 331 is mounted on the left side plate of left and right side plates of the cassette bottom support plate 401. Therefore, when the cassette bottom support plate 401 is moved down by the pantograph mechanism, the pop-up member 330 can move down or up together with the plate 401. The pivoting distal end of the pop-up member 330 faces upward in FIG. 15A and is parallel to the cassette bottom support plate 401 in FIG. 15B. This is so because a distal end portion 333 of a lever 332 formed at the rear end portion of the pop-up member 330 is pivoted by a projecting portion 19 provided at a fixed position. That is, when the tray unit 100 is pulled out most, the pop-up member 330 is pivoted clockwise about the shaft 331 by the projecting member 19. When the tray unit 100 moves backward, the distal end portion 333 of the lever 332 is separated from the projecting portion 19. Therefore, the pop-up member 330 is pivoted counterclockwise to be parallel to the cassette bottom support plate 401 by its own weight or a weak spring.

The operation timings of the front pop-up mechanism constituted by the pop-up member 230 and the like and the rear pop-up mechanism constituted by the pop-up member 330 are set as follows.

The front pop-up mechanism raises the front end of the cassette 200 at the position shown in FIG. 15B. When the tray unit 100 is further pulled out from the position shown in FIG. 15B to the position shown in FIG. 15A, the rear pop-up mechanism raises the rear pop-up member 330. As described above, the operation of the pop-up mechanism is obtained by the guidance or collision of the respective components upon movement of the tray unit 100. It is understood from this fact that the force to raise the cassette is obtained by the power of the motor 21 for driving the tray unit 100. Therefore, if both the front and rear pop-up mechanisms are simultaneously operated, a large load is applied on the motor 21. For this reason, a time difference is given between the operations of the front and rear pop-up mechanisms in this system (i.e., after the front pop-up mechanism raises the cassette, the rear pop-up mechanism raises the cassette). Consequently, the load on the motor 21 is reduced, and this enables driving by a low-power motor.

An auxiliary mechanism associated with the pop-up member 330 will be described.

Left and right pins 341 (shown in FIGS. 1 and 2) extend from the two side plates of the pop-up member 330. These pins 341 move in a direction along which the tray unit 100 is pulled. When the pop-up mechanism 330 moves to a predetermined position with its pivoting distal end facing up, the pins 341 ride on rest shelf portions 61 (shown in FIGS. 1 and 2) formed at fixed positions inside the housing. As a result, the lifted state of the pop-up member 330 can be maintained stably to prevent troubles between the projecting portion 19 and the distal end portion 333 of the lever 332. That is, as described above, the pop-up member 330 pivots about the shaft 331, and the projecting portion 19 holds the distal end portion 333 of the lever 332 when the open side of the pop-up member 330 is raised. In this state, however, an excessive force may be applied on the cassette-receiving side of the pop-up member 330 for receiving the cassette 300 upon insertion or removal of the cassette. Therefore, it is sometimes difficult to maintain the raised state of the pop-up member 330 by the engagement between the lever 332 and the projecting portion 19 (see FIGS. 15A and 15B). For this reason, the pins 341 ride on the inclined rest shelf portions 61 to stably maintain the lifted state of the pop-up member 330.

FIG. 16 shows a power source system for horizontally driving the tray unit 100 and a power source system for driving the pantograph mechanism.

The rotational force of the horizontal motor 21 for driving the tray unit 100 is transmitted from its pulley to the gears 41 and 42 and to the intermediate gear 22 described previously. This force is also transmitted to the intermediate gear on the right side via a shaft 43A. The forward rotation of the motor 21 realizes insertion of the tray unit 100, and its reverse rotation realizes extraction of the unit. Note that the rotation of the shaft 43A is also transmitted to a pulley 47 provided on the side plate 31R. The rotation of the pulley 47 is transmitted to a rotating member 1022 of a pulse generator used to measure the rotational amount of the motor 21 (i.e., the moving amount of the tray unit 100), thereby detecting the moving position of the tray unit 100.

The power source for driving the pivotal member 501 (see FIG. 10) of the pantograph driving mechanism is obtained from the vertical motor 51. The rotational force of the vertical motor 51 is transmitted from its pulley to the gears 52, 53, 54, and 55 and the cam 56. The rotational force of the gear 55 and the cam 56 is transmitted via a gear 57 and a shaft 58 to a gear 59 provided on the side plate 31L. The rotational force of the gear 59 is transmitted to the cam 43. A cam groove is formed in the inner surface of the cam 43, and the pin 511 extending from the arm of the pivotal member 501 engages with this cam groove. This enables the pivotal member 501 to drive the pantograph mechanism by its pivotal motion as described above. A similar pin 511 is also provided on the right side and driven by the cam groove of the cam 56 in synchronism with the left-side pin 511.

In this system having the above arrangement, the power source for horizontally moving the tray unit 100 and the power source for driving the pantograph mechanism are realized by the independent motors 21 and 51. Therefore, the system requires no switching mechanism for performing switching between horizontal driving and vertical driving by using a single motor, and this simplifies the power transmission mechanism. In addition, in order to selectively load a cassette in a predetermined position rapidly, the tray unit 100 must move to and wait at a target position rapidly. The motor 21 to be used for this purpose must have a variable speed. Driving the pantograph mechanism, on the other hand, requires neither high power nor high speed. That is, the power source for horizontal driving and that for vertical driving must have different characteristics. The system of the present invention can satisfy this requirement.

The above embodiment has the motor 51 for vertical driving only. However, the present invention is not limited to the above embodiment, but the pantograph mechanism may be driven by using the rotational force of a capstan motor. Since the capstan motor is free during cassette loading, it is possible to use its rotational force. In addition, since the number of motors can be reduced by one, advantages can be obtained in terms of a cost, a weight, and assembly steps.

Figures 17A, 17B:
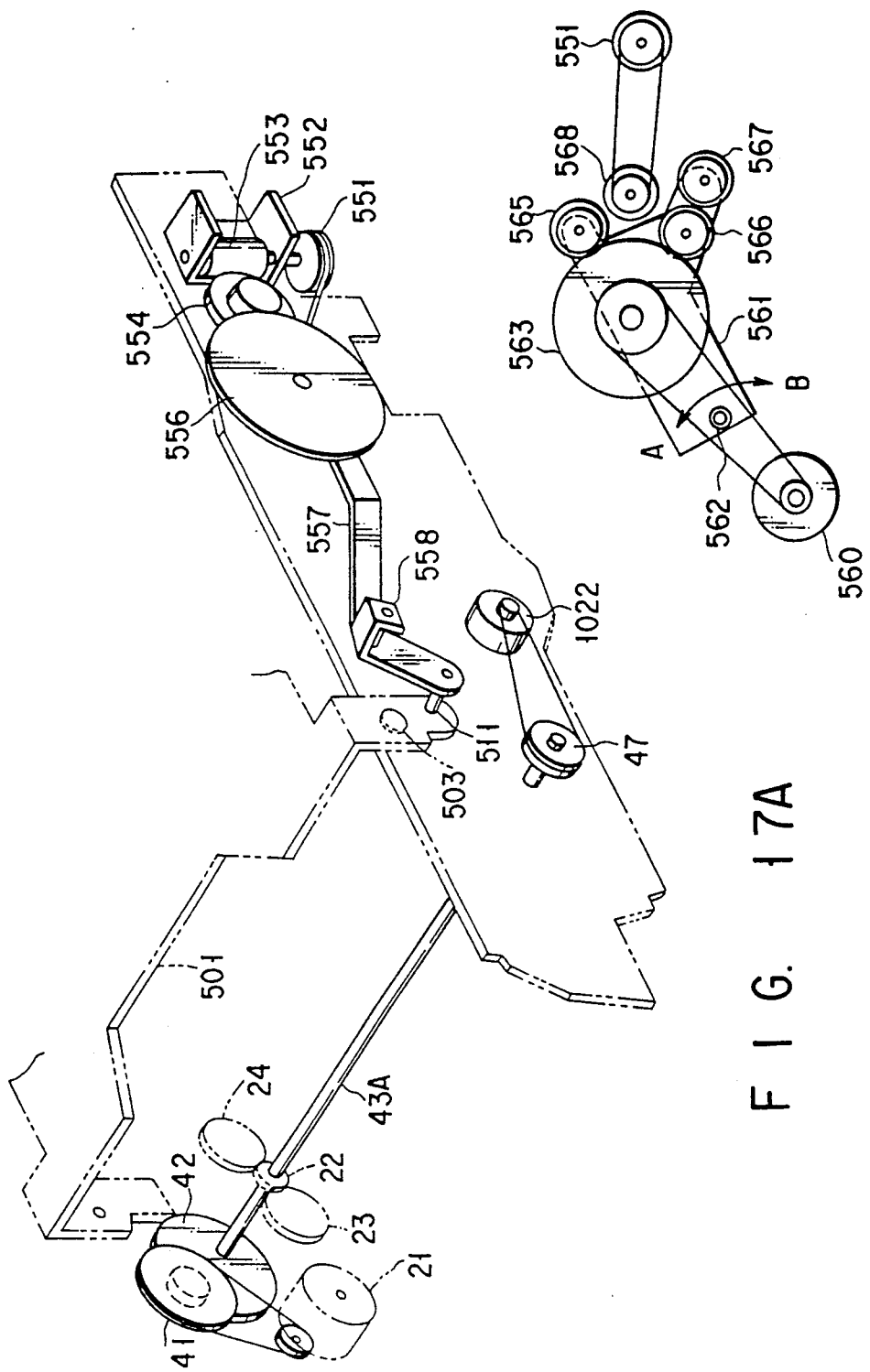
FIGS. 17A and 17B are views for explaining another example of the system of a power source for the tray unit and the pantograph mechanism of the above VTR.

FIGS. 17A and 17B show a system using the power from a capstan motor. Referring to FIG. 17A, the power of a capstan motor (not shown) is transmitted via a mounting member 552 from a pulley 551 to a worm gear 553 provided on the side plate 31R. The rotational force of the worm gear 553 is transmitted to a cam 556 via a gear 554. A cam groove is formed in the cam 556, and a pin at one end of a lever 557 engages with this cam groove. One end of the lever 557 is mounted pivotally on the side plate 31R by a shaft 558. The other end of the lever 557 engages with the pin 511 of the pivotal member 501. Therefore, by driving the cam 556 using the capstan motor, driving of the pivotal member 501 can be controlled via the lever 557. The pivotal member 501 has already been described above with reference to FIGS. 9A and 9B, 10, and 11A to 11C.

FIG. 17B shows an example of a mechanism for transmitting the rotational force of a capstan motor 560 to the pulley 551. A switching plate 561 is rotated about a shaft 562 (arranged at a fixed position) in a direction indicated by an arrow A or B in order to obtain vertical movement of the pantograph mechanism. The switching plate 561 has a gear 563, gears 565 and 566 meshing with the gear 563, and a gear 567 meshing with the gear 566. The capstan motor 560 and the gear 563 are interlocked with each other by a belt. In order to move the pantograph mechanism downward, the switching plate 561 is controlled in the direction of arrow B, and the rotation of the gear 565 is transmitted to a gear 568. The gear 568 is rotatably mounted at a fixed position of the chassis and coupled with the pulley 551 via a belt. This makes it possible to obtain the downward movement of the pantograph mechanism. When the capstan motor 561 is to perform tape driving, the switching plate 561 is pivoted to the position as shown in FIG. 17B. In this position, no rotational force is transmitted to the gear 568. In order to move the pantograph mechanism upward, the pulley 551 is rotated in a direction opposite to the previous direction. Therefore, the switching plate 561 is pivoted in the direction of arrow A, and the gears 567 and 568 mesh with each other. As a result, the upward movement of the pantograph mechanism is obtained. After this operation, the switching plate 561 is returned to the position shown in FIG. 17B. The driving of the switching plate 561 can be realized by, e.g., a plunger driven by logic circuits.

According to the apparatus of the present invention as described above, a plurality of cassettes are loaded on the tray unit and moved to various positions so as to be selectively placed in the recording and reproducing section. In this case, the power source for obtaining horizontal movement of the tray unit is provided independently of the power source for obtaining vertical movement of the cassettes. Consequently, operations corresponding to the respective conveyance characteristics can be obtained.

FIGS. 18A and 18B show a clicking member used when the tray unit 100 is moved to the position shown in FIG. 6B.

A tray unit capable of loading a plurality of cassettes has a large weight, and this increases its moment of inertia upon movement. For this reason, when it is attempted to stop the tray unit 100 during movement, the unit sometimes passes a desired position even if the horizontal driving motor 21 is stopped. In this system, therefore, a clicking member 81 is provided at a predetermined position as shown in FIGS. 18A and 18B. This clicking member 81 is mounted on the side plate 31L. FIG. 18B shows the side plate 31L viewed from the outside. A projection 81a serving as a pivot center is formed in the middle portion in the front-and-back direction. This projection 81a extends through a hole (sufficiently larger than the projection 81a) formed in the side plate 31L and is pulled down by a spring. L-shaped locking portions 81b and 81c are formed before and behind the clicking member 81 and engage with elongated holes formed in the side plate 31L, respectively. Therefore, the clicking member 81 can not only pivot about the projection 81a as indicated by an arrow but also move vertically because the projection 81a has play with respect to the through hole. However, the clicking member 81 is normally pulled down by the spring. In addition, the front and rear end portions of the clicking member 81 are formed slant portions. Therefore, a projection 140 formed on the frame of the tray unit 100 can ride on these portions. A notch 81d into which the projection 140 is fitted is formed in a portion immediately below the projection 81a to receive the projection 140.

When the tray 100 is moved to a stop position, therefore, position detection is performed by a position detecting means, and the motor 21 is turned off, thereby accurately stopping the tray unit 100 at a desired position by the clicking member 81. Consequently, it is possible to accurately perform driving of the pantograph mechanism and loading of a cassette onto the tape driving section.

FIGS. 19A and 19B show a means for obtaining the moving position data of the tray unit 100 in order to detect the horizontal moving position of the unit. An L-shaped first differential lever 1012 is arranged along the outer surface of the side plate 31R, and its bent portion is pivotally mounted on the side plate 31R by a shaft 1013. A pin 1014 extends from the upper end of the differential lever 1012 through a hole in the side plate 31R. The lower end of the differential lever 1012 engages with one end of a second differential lever 1015. The second differential lever 1015 extends backward along the lower edge of the side plate 31R, and its rear end portion extends upward. A pin 1016 extends from this rear end portion through a hole formed in the side plate 31R. The other end portion of the differential lever 1015 is biased forward by a spring.

When the first differential lever 1012 pivots clockwise about the shaft 1013, therefore, the second differential lever 1015 is pulled forward. When, on the other hand, the first differential lever 1012 pivots counterclockwise, the second differential lever 1015 is pushed backward. A switch driving portion 1017 is formed midway along the second differential lever 1015 and drives switches 1101 and 1102 by the front-and-back movement. The pulley 47 which is rotated by the motor 21 is also arranged outside the side plate 31R. The rotation of the pulley 47 is transmitted to a rotary member 1022 mounted rotatably on the side plate 31R. The rotary member 1022 is a cylinder having a shaft, and a large number of slits are formed in the cylinder along the direction of the shaft. When this rotary member 1022 rotates, rotation detection pulses can be obtained from a rotation detecting element 1103 constituted by 10 light-receiving and light-emitting elements arranged inside and outside the cylinder. Since the motor 21 horizontally moves the tray unit 100 as described above, the number of rotation detection pulses indicates the amount of horizontal movement.

A switch driving member 1025 is also mounted pivotally on the side plate 31R via a shaft 1026. The switch driving member 1025 has a pin 1027 at the distal end of its first arm. The pin 1027 extends through a hole in the side plate 31R. The switch driving member 1025 also has second and third arms 1028 and 1029 outside the side plate 31R. The arms 1028 and 1029 oppose each other in the pivotal direction. The pin 1027 formed on the first arm is associated with the tray unit 100, and the second and third arms 1028 and 1029 are associated with switches 1105 and 1106.

The switches 1101 to 1103, 1105, and 1106 are mounted on a printed circuit board 1100 for tray position detection and arranged on the side of the side plate 31R. When the printed circuit board 1100 is mounted on the side plate 31R, these switches are associated with the respective corresponding components. The operations of these components will be described in detail later with reference to FIGS. 21A to 21E. The pulley 47, the rotary member 1022, and the printed circuit board 1100 are also illustrated in FIGS. 2 and 3.

The above system has a countermeasure against the case in which the tray unit 100 passes a predetermined stop position by, e.g., an inertial force. In this case, the power source voltage of the horizontal motor 21 is switched to an opposite polarity and dropped. This control is repeatedly performed by a controller until the tray is stopped at the desired stop position.

Figures 20A, 20B:
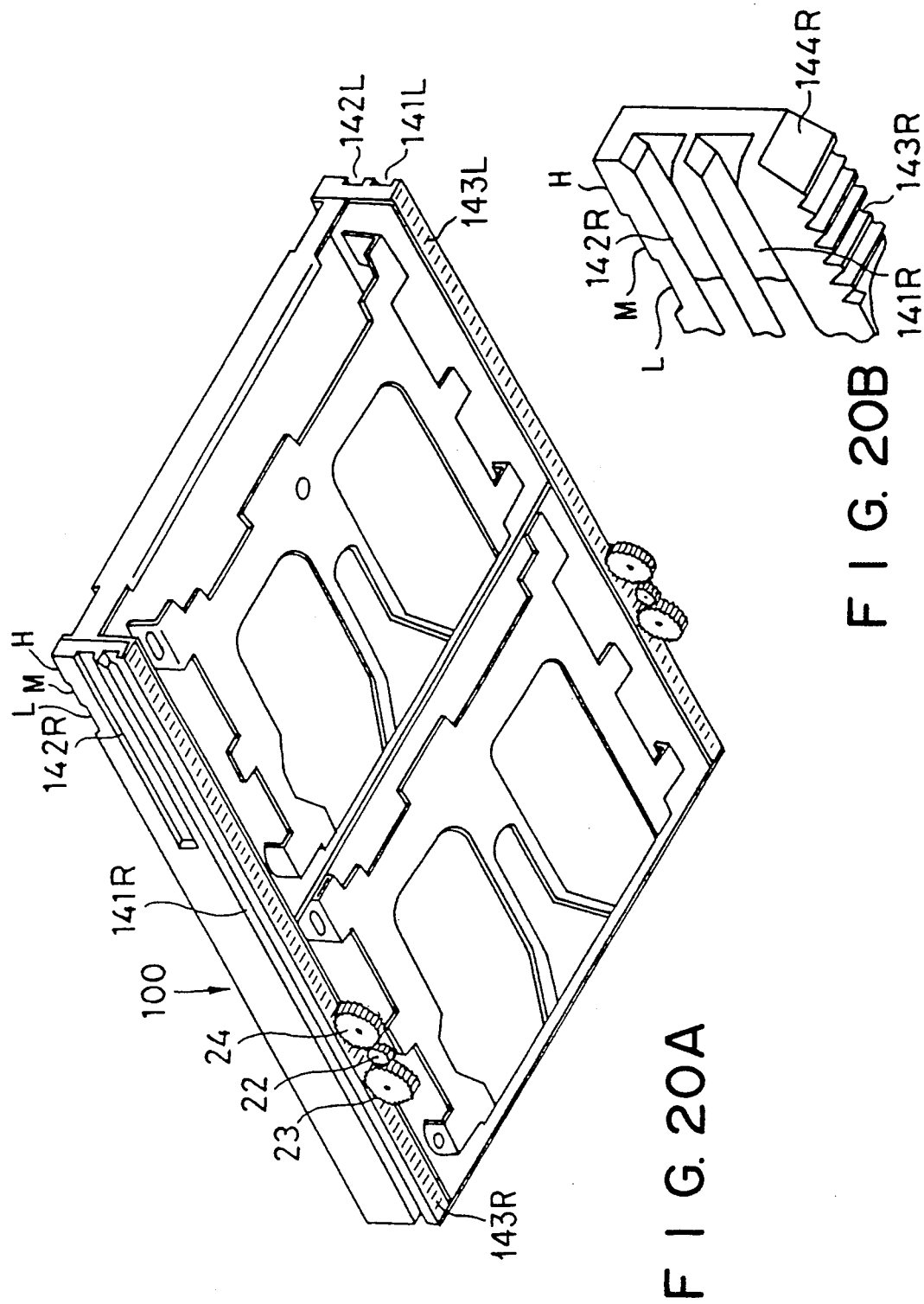
FIGS. 20A and 20B are perspective views showing a tray unit according to the present invention when viewed from the below.

FIGS. 20A and 20B show the tray unit 100 viewed from the below. As described above, since the left and right racks 143L and 143R are formed in the lower portion of the frame, the tray unit 100 is moved horizontally by the gears 22, 23, and 24 driven by the motor 21. In the side portions of the frame, rail grooves 141L and 141R are formed to be guided by rollers (not shown) provided on the side plates 31L and 31R. Regulating grooves 142R and 142L are also formed parallel to the grooves 141R and 141L from the rear end portions toward the front. As shown in FIG. 20B, the rear end portion of each groove is widened by inclined surfaces. The end portion of a rack 143R also has an inclined surface 144R in order to control a pin 1027 of a switch driving member 1025. In addition, steps H, M and L for detecting movement of the tray unit 100 are formed on the top surface which is right side of the frame.

The operational association of the various components (constituting the tray position data detecting mechanism) shown in FIGS. 19A and 19B with the tray unit 100 shown in FIGS. 20A and 20B will be described below with reference to FIGS. 21A to 21E.

Figure 21A:
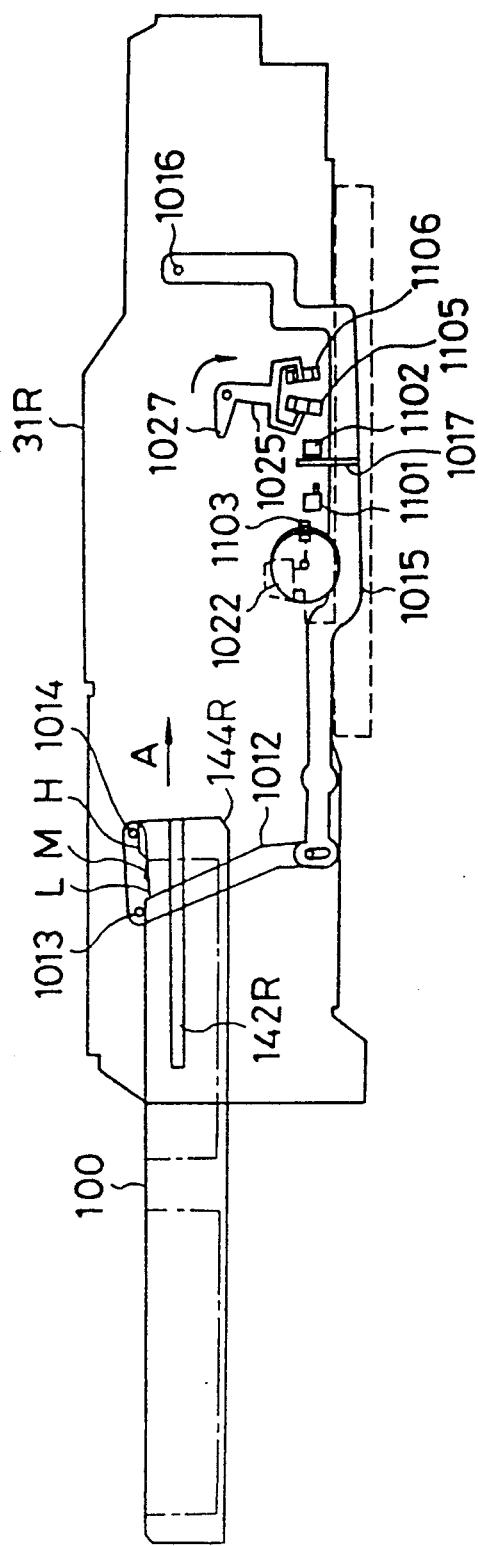
FIGS. 21A to 21E are views for explaining a plurality of operation modes of an apparatus according to another embodiment of the present invention.

FIG. 21A shows a state in which the tray unit 100 is pulled out maximally. In this state, the pin 1014 of the differential lever 1012 rides on the highest step H in a step portion of the frame of the tray unit 100. Therefore, the differential lever 1012 is pivoted counterclockwise, and the differential lever 1015 is pushed backward. As a result, the switch driving portion 1017 turns on the switch 1102. Since the switch driving member 1025 is merely pulled by the spring, it is pivoted clockwise to turn off the switch 1106. In this state, assume that a reproduction operation is performed for the rear cassette in order to transit to the state shown in FIG. 6B. At this time, the driving voltage of the motor 21 is set at a low level VL in order to obtain smooth start. The tray unit 100 is pushed in the direction of an arrow A by a user.

Figure 21B:
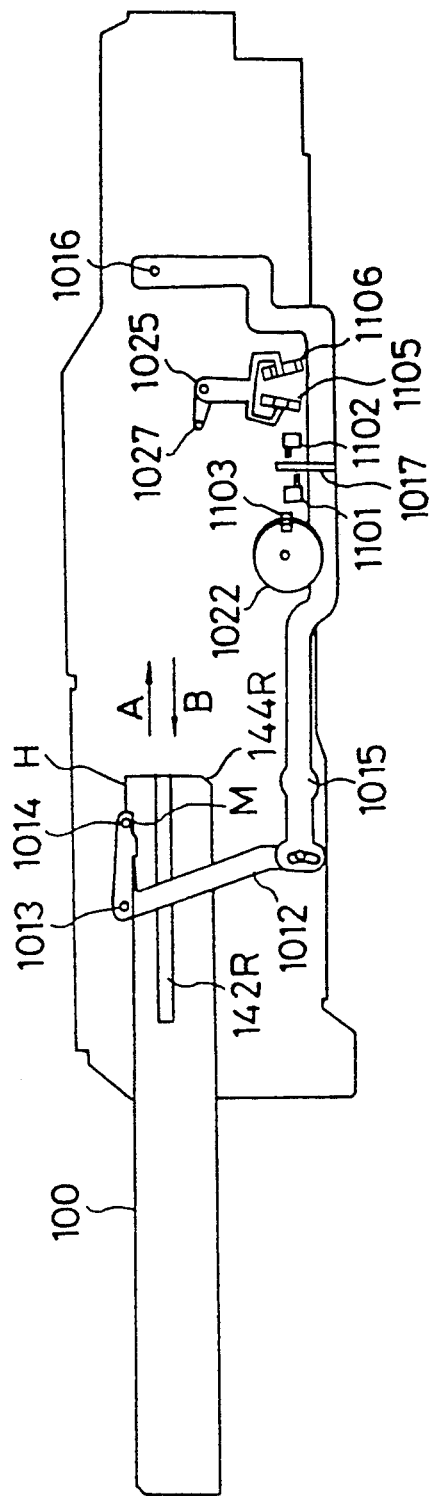

As a result, the pin 1014 of the differential lever 1012 rides on the middle step M of the tray unit 100 with the movement of the tray unit 100, as shown in FIG. 21B. In this case, since the differential lever 1012 is slightly pivoted clockwise, the differential lever 1015 slides forward (the direction of an arrow B) to turn off the switch 1102, and the system is designed such that the switch 1101 is also turned off in this case. A switch output obtained when the switch 1102 is switched from ON to OFF is used as a timing signal for turning on the motor 21.

Figure 21C:
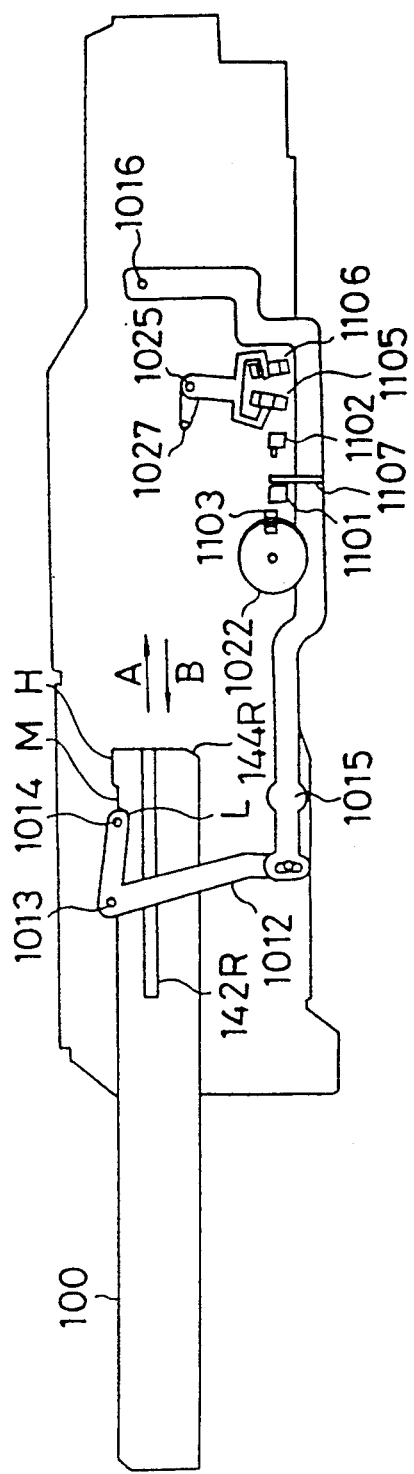

Consequently, the motor 21 starts rotation at the driving voltage VL, and the tray unit 100 automatically starts moving in the direction of arrow A. A state immediately after the start is as shown in FIG. 21C. In this state, since the pin 1014 of the differential lever 1012 reaches a lowest step L, the differential lever 1012 is further pivoted clockwise to pull the differential lever 1015 forward. As a result, the switch driving portion 1017 of the differential lever 1015 turns on this time the switch 1101. A switch output at this time is used as a start timing signal for counting the rotation detection pulses output from the rotation detecting element 1103. At the same time, the driving voltage of the motor 21 is switched from VL to VH (VL<VH). Therefore, the tray unit 100 moves horizontally at a high speed to shorten the time period from the operation start timing to the timing at which a cassette is placed in a predetermine position.

Figure 21D:
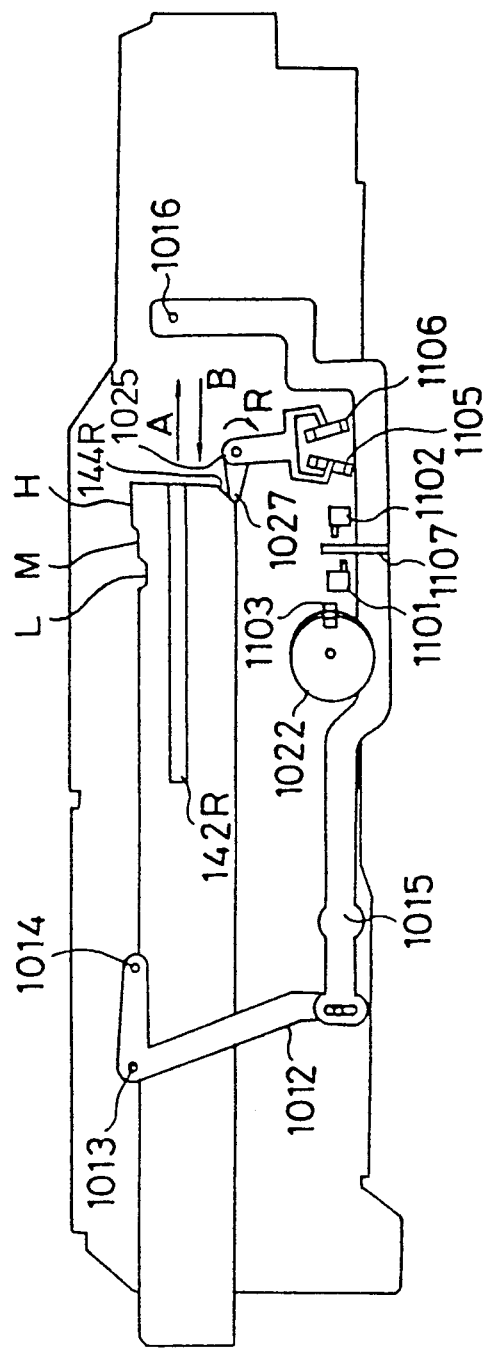

FIG. 21D shows a state in which the tray unit 100 moves and its rear end portion 144R holds the pin 1027 of the switch driving member 1025. The moving position of the tray unit 100 immediately before this state is obtained through the rotation detecting element 1103 and a counter for counting the output pulses from the element. Therefore, a motor control circuit is arranged such that when the value of the counter indicates the position immediately preceding the state shown in FIG. 21D, the driving voltage of the motor 21 is switched to VM (VL<VM<VH).

In the state shown in FIG. 21D, a portion (inclined surface 144R) of the tray unit 100 pushes the pin 1027 downward. As a result, the switch driving member 1025 turns off the switch 1105, and this switch output at this time is used as a timing signal for stopping the rotation of the motor 21 (i.e., for stopping the tray unit 100). Immediately before this state, the driving voltage of the motor 21 is set at VM, i.e., the speed is decreased. Therefore, the motor 21 can be stopped smoothly, and it is also possible to stop the tray unit 100 at an accurate position in association with the operation of the clicking means described previously.

Suppose that a reproduction operation is performed for the front cassette from the state shown in FIG. 21D (in order to transit the state shown in FIG. 6B to the state shown in FIG. 6C). In this case, the motor 21 is turned on again to move the tray unit 100 deepest. The driving voltage of the motor 21 at the start is VH. Counting of the rotation detection pulses from the rotation detecting element 1103 is started at the same time the motor 21 is started, and the driving voltage of the motor 21 is switched to VM immediately before transition to the state shown in FIG. 21E. In the state shown in FIG. 21E, the pin 1016 of the differential lever 1015 enters the groove 142R of the tray unit 100 and collides against the end portion of the groove 142R. As a result, the differential lever 1015 is pulled in the direction of arrow A to turn on the switch 1102. This output from the switch 1102 is used as a timing signal for stopping the rotation of the motor 21. The state shown in FIG. 21E corresponds to that of FIG. 6C, in which the front cassette can be placed in the driving position by the pantograph mechanism.

Figure 21E:
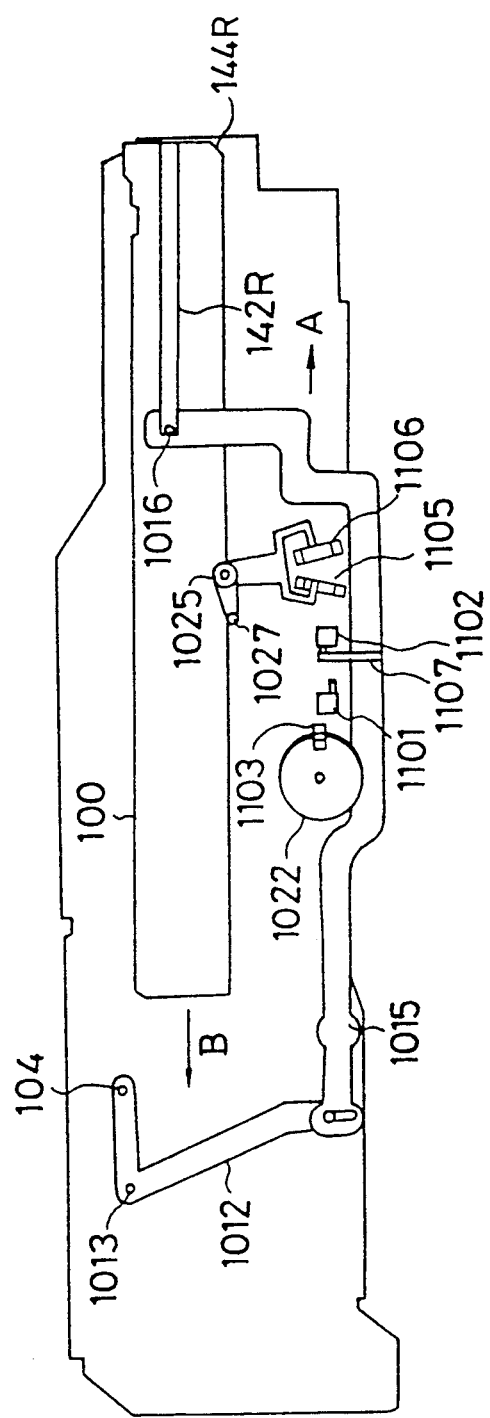

In order to transit the state shown in FIG. 21E back to the state shown in FIG. 21D, the motor 21 is rotated reversely, and a process opposite to that described above is executed. Therefore, the tray unit 100 is moved in the direction of arrow B. At this time, the driving voltage of the motor 21 is set at −VH. When the switch 1102 is turned off, counting of the rotation detection pulses from the rotation detecting element 1103 is started. Immediately before transition to the state shown in FIG. 6B, the driving voltage of the motor 21 is changed to −VM. When the tray unit 100 further moves slightly in the direction of arrow B in the state of FIG. 21D, the switch driving member 1025 is pivoted clockwise to turn off the switch 1106. This switch output is used as a stop timing signal for the tray unit 100.

When a cassette out operation is performed from the state shown in FIG. 21D, the motor 21 is driven at −VH to move the tray unit 100 in the direction of arrow B. When the state of FIG. 21C is obtained, the switch 1101 is turned on. This switch output is used as a timing signal for switching the motor driving voltage from −VH to −VL. Since the switch 1102 is turned on when the state transits to that shown in FIG. 21A, this output is used as a motor stop timing signal. As a result, the tray unit 100 to be extracted is first moved at a high speed and then decelerated and stopped in the state of FIG. 21A. Therefore, upon extraction of the tray unit 100, a smooth and soft extraction operation can be obtained without producing any collision noise. The means for checking the output from each switch to switch the driving voltage of the motor can be realized by logic circuits.

Note that the moving position detecting means of the tray unit 100 is not limited to that of the above embodiment, but various other embodiments are possible.

Figure 22:
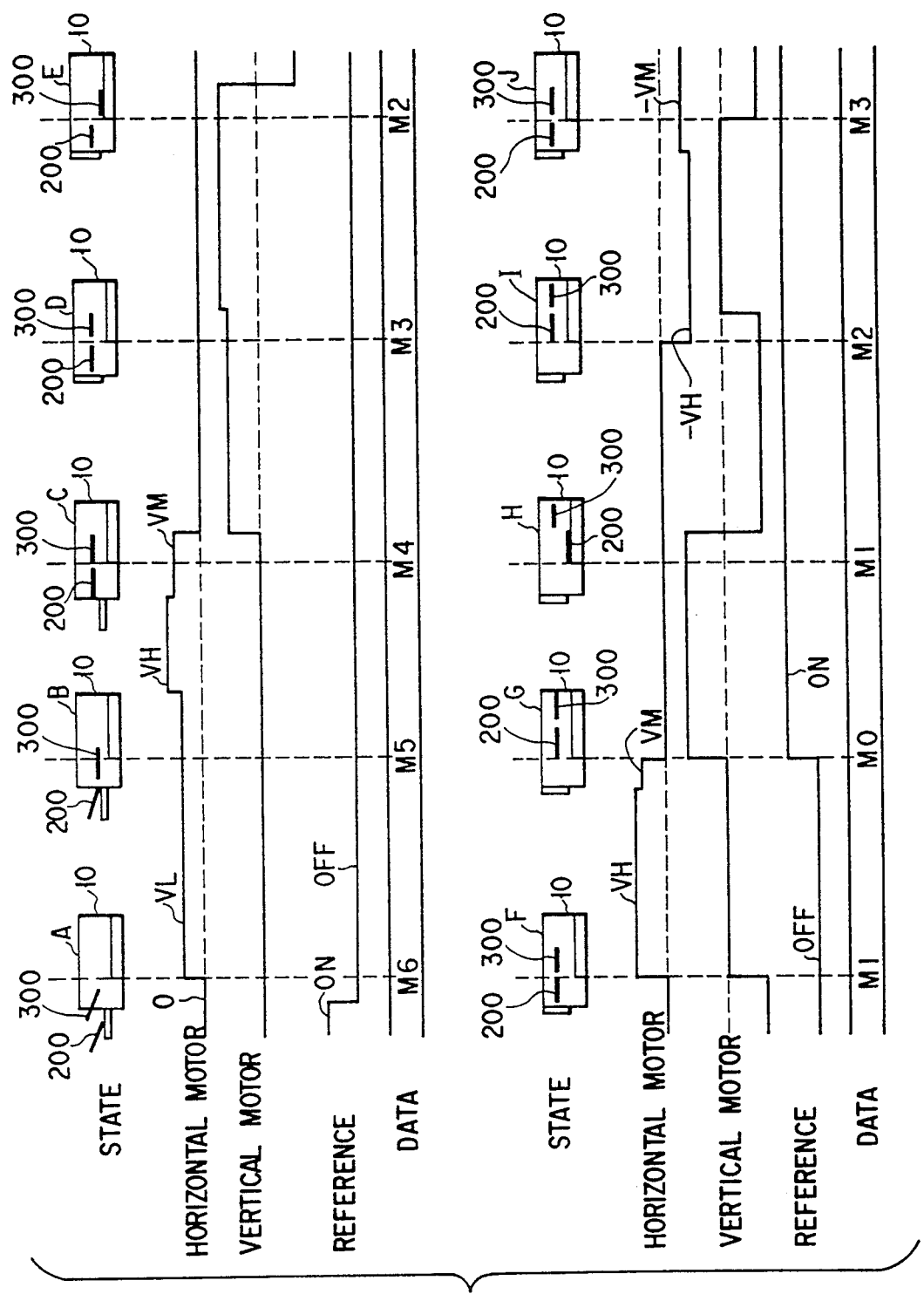
FIG. 22 is a timing chart for explaining the operation timings of the apparatus according to the embodiment of the present invention.

FIG. 22 shows the respective positions of the tray unit 100 described above and the changes in driving voltage of the motor 21. In FIG. 22, positions A to J of the tray unit 100 to be moved as described previously are also illustrated by the respective corresponding states of the front and rear cassettes 200 and 300. FIG. 22 also shows the relationship between the voltage to be supplied to the horizontal motor 21, the voltage to be supplied to the vertical motor 51, and data M6 to M0 each indicating the number of pulses from the pulse generator, in correspondence with each of the above states. The ON/OFF state of the switch for detecting the reference position of the tray unit 100 is inverted in, e.g., the state G. The state G means as same as the state shown in FIG. 21E, and the detecting switch for detecting the reference position is shown the numeral 1101. Accordingly, a control circuit, for example, resets the contents of an up/down counter for holding data to 0. Switching between the up count and the down count is performed in accordance with the direction of rotation of the horizontal motor 21.

As described above, this system has a means for finely detecting the front-and-back moving position of the tray unit 100.

Figure 23:
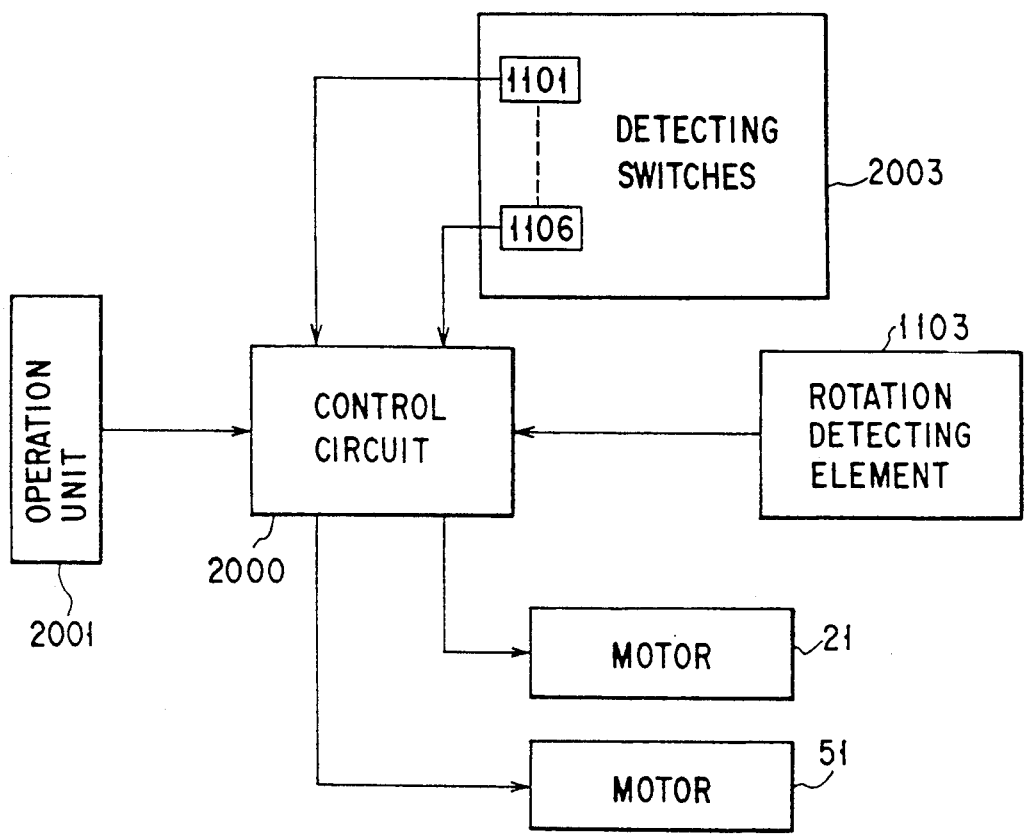
FIG. 23 is a block diagram showing an example of a control system applied to the present invention.

FIG. 23 shows an example of a control system for controlling the horizontal motor 21 and the vertical motor 51 described above. A control circuit 2000 can control the horizontal and vertical motors 21 and 51. The control circuit 2000 receives operation data (e.g., cassette selection data, eject data, recording, or reproduction) from an operation unit 2001. The control circuit 2000 also receives data from the rotation detecting element 1103 and switches 1101, 1102, 1105 and 1106 and various detecting switches 2003 described above with reference to FIGS. 20A to 21E. Therefore, the control circuit 2000 can detect the moving position of the tray unit 100 in accordance with the rotational directions and the stop states of the horizontal and vertical motors 21 and 51 and the number of the output pulses from the rotation detecting element 1103. As a result, the control circuit 200 can accurately track the moving position of the tray unit 100, and this makes it possible to control the voltage supplied to the horizontal motor 21 before the tray unit 100 is stopped, thereby smoothly stopping the tray unit 100. The position data can also be used when the tray unit 100 is started to move. In this case, the horizontal motor 21 is first started slowly and then rotated at a high speed after a predetermined time interval.

When the tray unit 100 pulled out maximally from the housing 10 is pushed to be automatically loaded into the housing, the fingers of a user may be pulled in together with the tray unit 100, or a foreign matter other than a cassette may be taken into the housing. In this case, a large load is applied on the tray unit 100, and this stops the rotation of the motor 21. As a result, no pulse can be obtained from the rotation detecting element 1103. In this system, therefore, if no pulses are obtained from the rotation detecting element 1103 after the tray unit 100 is inserted, occurrence of an accident can be determined immediately. The pulse output described above can also be used as such a safety means.

According to the apparatus of the present invention as described above, a plurality of cassettes are loaded on the tray unit and moved to various positions so as to be selectively placed in the recording and reproducing section. The braking means for this purpose realizes accurate positioning with its simple arrangement, and the means for controlling the driving motors is also provided to improve the operational reliability of the apparatus. In addition, this apparatus can accurately detect the moving position of the tray unit to a fine level. Therefore, the apparatus can be suitably used in controlling the movement of a tray unit which is required to move to a large number of positions and has a large weight.

FIGS. 24A and 24B show another example of the position data generating system of the tray unit 100.

In the position data generating system of the tray unit 100 in the above embodiment, the rotational force of the motor 21 is transmitted to the pulse generator via the intermediate gear. As shown in FIG. 24A, however, the rotation of a horizontal motor 21 may be transmitted to a rotary member 1022 of a pulse generator via a belt. Reference numeral 1103 denotes a rotation detecting element. Various modifications can be made as the pulse generator. Referring to FIG. 24B, a rotary member 1022 constituted by a permanent magnet in which the N and S polarities are arranged alternately along the circumferential direction is used as the rotary member of the pulse generator, and a rotation detecting element 1103 incorporating a pickup coil is used as the rotation detecting element.

Examples of the application and still another embodiment of the apparatus of the present invention will be described below.

Figure 25:
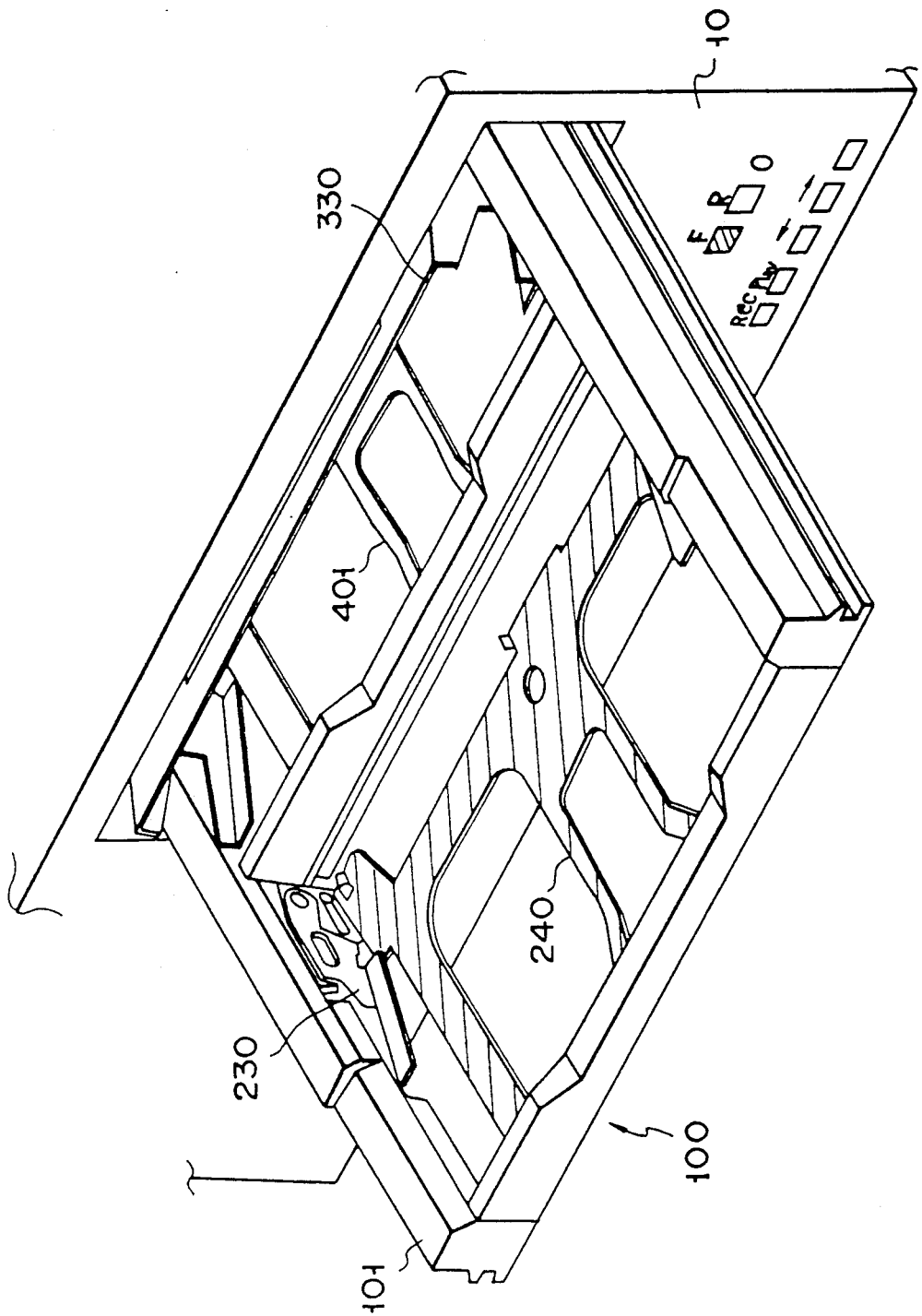
FIG. 25 is a perspective view showing the tray unit and its operation of the above VTR.

FIG. 25 is a perspective view schematically showing a state in which the tray unit 100 is pulled out most from the housing 10. As is apparent from FIG. 25, the pop-up members 230 and 330 are set such that their front pivotal ends face upward with respect to the horizontal cassette bottom support plates 240 and 401.

Although two cassette tapes can be loaded in this system as described above, some users selectively use a mode in which only the front portion is used and a mode in which only the back portion is used. For example, the front cassette is used for both recording and reproduction, whereas the rear cassette is used for reproduction only. In this case, it is necessary to load a cassette for reproduction purposes only in the back region and a cassette which can be used in both recording and reproduction in the front region. Possible loading errors in this case can be prevented by, for example, discriminating the cassette bottom support plate 240 in the front region from the cassette bottom support plate 401 in the back region by colors, e.g., blue and red. For example, a user himself or herself can make determinations that a cassette usable in recording is to be loaded in the blue mounting region and a cassette for reproduction purposes only, which is not to be used in recording, is to be loaded in the red loading region. Referring to FIG. 25, this discrimination is made by colors of the front and rear cassette bottom support plates. However, this discrimination by color may be made on the frame or may be made only partially. Alternatively, seals having marks on them may be adhered. The operation panel of the VTR main body has operation buttons such as recording Rec, playback Play, rewind, fast-forward, and stop buttons, and buttons for designating front cassette loading F and rear cassette loading R are also provided.

FIG. 26A shows a state in which the tray unit 100 is maximally extracted from the housing 10 to make it possible to load cassettes in both the front and back regions (full-use mode). FIG. 26B shows a state in which the tray unit 100 is extracted halfway and a cassette can be loaded in only the front region (half-use mode). The use modes shown in FIGS. 26A and 26B can be designated in advance by a tray mode designation button TM. When the full-use mode is designated, the position detecting unit for detecting the position of the tray unit 100 performs tray extraction end detection at the time the state of FIG. 26A is set. When the half-use mode is designated, the position detecting unit for detecting the position of the tray unit 100 performs tray extraction end detection upon setting of the state shown in FIG. 26B.

Figure 27:
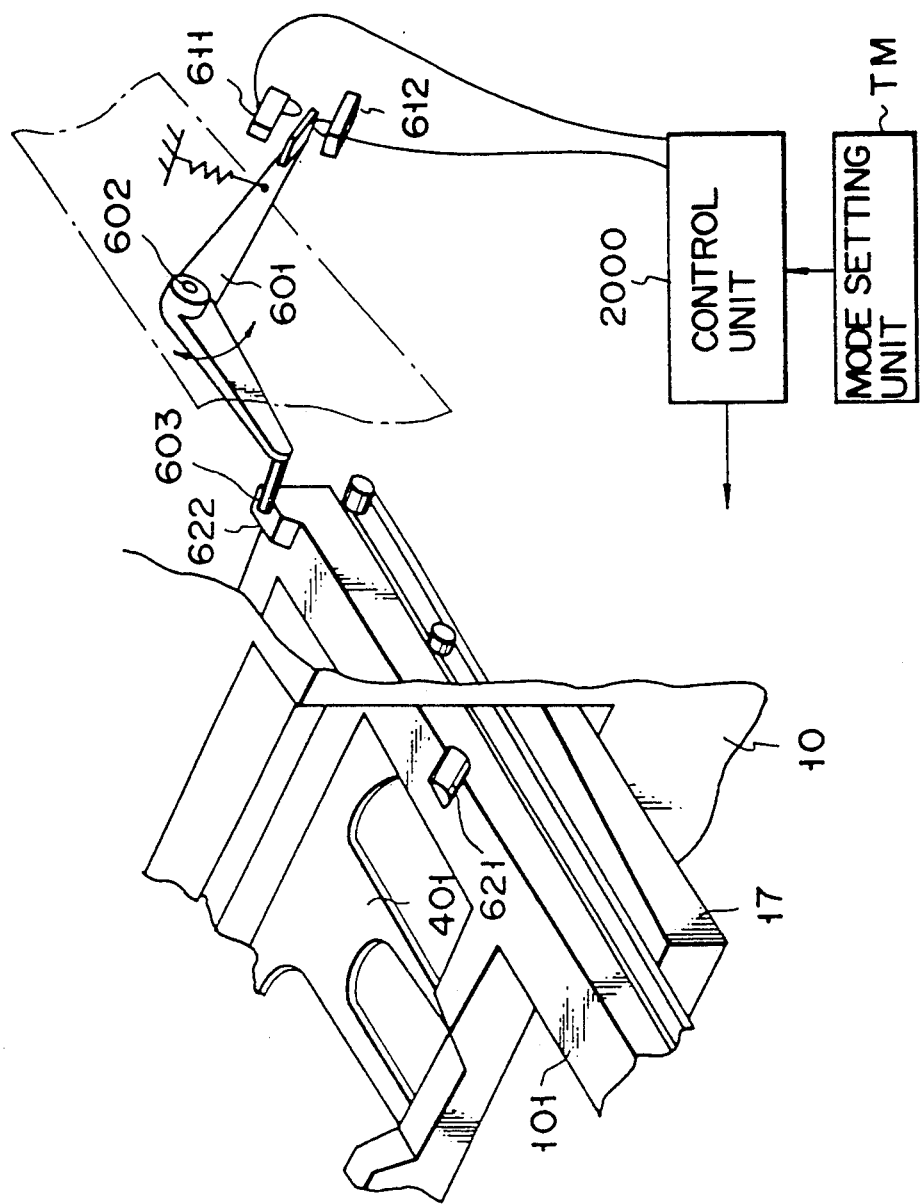
FIG. 27 is a view showing an example of a tray position detecting unit for obtaining the use state of the tray unit shown in FIGS. 26A and 26B.

FIG. 27 shows an example of the position detecting unit usable when the tray unit 100 is used as shown in FIGS. 26A and 26B. A tray extraction position detecting lever 601 is an L-shaped member mounted to be vertically pivotal by a shaft 602 at a fixed position midway along the path through which the frame 101 of the tray unit 100 passes. A pin 603 is provided at one pivotal distal end portion of the position detecting lever 601 and projects toward the top surface of side edge of the frame 101. The pin 603 can elastically abut against and slide on the upper surface of the edge of the frame 101. The other pivotal end portion of the position detecting lever 601 is arranged between microswitches 611 and 612 aligned in the vertical direction as the pivoting direction. On the other hand, a recess portion 621 and a step portion 622 are formed at a predetermined interval therebetween on the edge surface (which corresponds to the pin 603) of the frame 101. Therefore, when the pin 603 enters the recess portion 621, the position detecting lever 601 pivots counterclockwise about the shaft 602 to turn on the microswitch 611. When the pin 603 rides on the step portion 622, the position detecting lever 601 pivots clockwise to turn on the microswitch 612. Referring to FIG. 27, the recess portion 621 is formed in the front portion and the step portion 622 is formed in the back portion. The state in which the pin 603 is in the recess 621 corresponds to the state shown in FIG. 26B, and the state in which the pin 603 is on the step portion 622 corresponds to the state shown in FIG. 26A.

When the full-use mode is designated, therefore, a detection signal from the microswitch 612 is used as a tray extraction end signal. When the half-use mode is designated, a detection signal from the microswitch 611 is used as the tray extraction end signal. The output signals from the microswitches 611 and 612 are supplied to a control circuit 2000 for controlling the entire system. Upon receiving an operation signal from an operation unit, the control circuit 2000 controls the functions of the respective units of the apparatus in accordance with preprogrammed procedures. Information from the tray mode designation switch TM is also supplied to the control circuit 2000. The control circuit 2000 determines the selection between detection signals in accordance with the information from that switch. Upon receiving the tray extraction end signal, the control circuit 2000 stops rotation of the motor 21 which constitutes the tray driving mechanism.

Figure 28A:
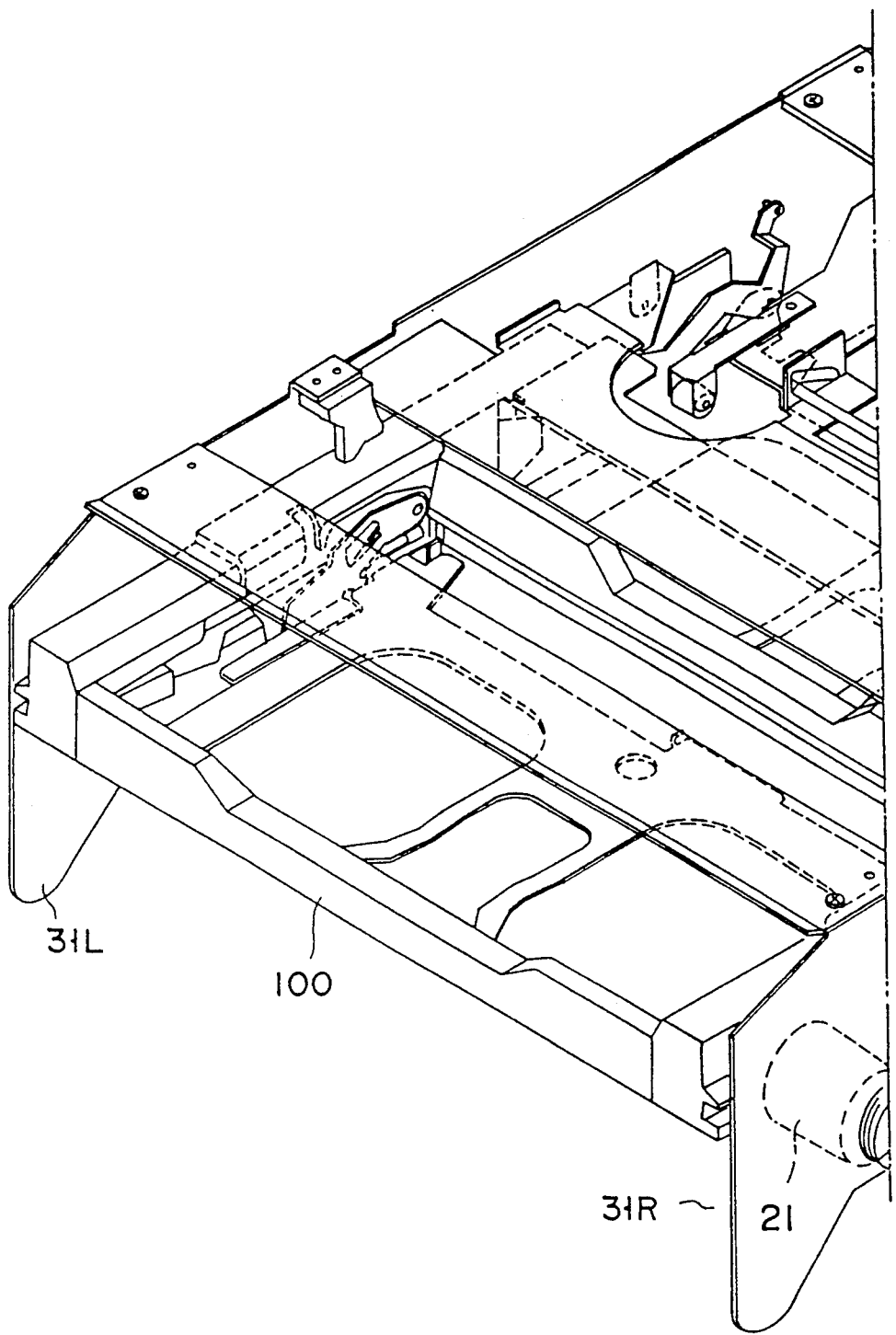

FIGS. 28A and 28B shows another embodiment of the entire mechanism of the present invention.

In the VTR shown in FIGS. 1 to 4, the horizontal motor 21 and the vertical motor 51 are provided on the left and right side plates of the chassis main body, respectively. In this embodiment, however, both of horizontal and vertical motors are provided on one side (a side plate 31R). Note that the same reference numerals as in the previous embodiment denote the same parts in this embodiment. Reference numeral 100 denotes a tray unit which can be horizontally inserted and removed in the front-and-back direction through an opening portion (not shown) formed in a front wall of a housing (not shown). The tray unit 100 has a tray frame which looks like a frame when viewed from the above. Rails formed outside the side plates of the tray frame are guided by rollers provided inside plates 31R and 31L in the housing, thereby moving the tray unit 100 horizontally. In this system, two cassettes 200 and 300 can be placed in front and back regions of the top surface of the tray unit 100. When a tray driving motor 21 (horizontal motor) mounted on the plate 31R is controlled by a control circuit (not shown), the tray unit 100 is moved to various horizontal moving positions. The rotation of the horizontal motor 21 is transmitted to a driving gear provided inside the plate 31R via an intermediate gear 22. As a result, the rotation of the horizontal motor 21 is transmitted to the tray unit 100 as described above, and this makes it possible to move the tray unit 100 forward or backward.

A rotary cam 1920 mounted on the chassis 31R constitutes a pantograph driving mechanism for driving a pantograph mechanism provided in the tray unit 100. The rotary cam 1920 has a cam groove 1921 which engages with a pin of a lever 1922. The rotary cam 1920 is rotated clockwise or counterclockwise upon receiving the rotational force of a pantograph driving motor 1923 (vertical motor) transmitted via gears 1924 and 1925. The rotary cam 1920 drives the lever 1922, thereby driving the pantograph mechanism as described previously. Note that a cassette holding mechanism and the pantograph driving mechanism are constituted by the same principles as in the above embodiment. The rotational position of the rotary cam 1920 is transmitted to a position detecting switch via a lever 1922, and in this manner the state of the pantograph mechanism is detected.

What is claimed is:

1. An apparatus capable of loading a plurality of cassettes, comprising:
    a housing incorporating a tape driving section;
    a cassette carrying unit capable of carrying a plurality of cassettes while being located inside said housing, for conveying the cassettes to a position from which the conveyed cassette can be loaded in said tape driving section;
    a motor mounted at a fixed position in said housing, for moving said cassette carrying unit;
    a rotary member mounted at a fixed position in said housing so as to be rotated interlocking with said motor; and
    pulse generating means, interlocking with the rotation of said rotary member, for generating pulses in number corresponding to a rotational speed of said rotary member to generate data for determining a moving distance of said cassette carrying unit.

2. An apparatus according to claim 1, wherein said cassette carrying unit is a single unit for simultaneously carrying a plurality of cassettes.

3. An apparatus capable of loading a plurality of cassettes, comprising:
    a housing incorporating a tape driving section;
    a cassette carrying unit capable of carrying a plurality of cassettes while being located inside said housing, for conveying the cassettes to a position from which the conveyed cassette can be loaded in said tape driving section;
    a motor, mounted at a fixed position in said housing, for moving said cassette carrying unit;
    a rotary member mounted at a fixed position in said housing so as to be rotated interlocking with said motor;
    pulse generating means, interlocking with the rotation of said rotary member, for generating pulses in number corresponding to a rotational speed of said rotary member; and
    control means for counting the pulses generated by said pulse generating means to determine a moving distance of said cassette carrying unit, and varying a rotational speed of said motor to assume a value between a maximum rotational speed and minimum rotational speed according to the moving distance.

4. An apparatus according to claim 3, wherein said control means comprises:
    detecting means for detecting a state in which said cassette carrying unit is moving inside said housing and is at a maximum position from said housing; and
    means for stopping said motor if no pulses are generated by said pulse generating means after said control means receives a detection signal from said detecting means indicating detection of said state.

5. An apparatus according to claim 3, wherein said cassette carrying unit is a single unit for simultaneously carrying a plurality of cassettes.

6. An apparatus capable of loading a plurality of cassettes, comprising:
    a housing incorporating a tape driving section;
    an opening portion formed in a front wall of said housing;
    a cassette carrying unit which can be horizontally inserted or removed in a front-and-back direction through said opening portion and in which a plurality of cassettes can be placed on a top surface in the front-and-back direction;
    a motor, mounted at a fixed position in said housing, for driving said cassette carrying unit horizontally via a gear meshing with a rack of said cassette carrying unit;
    a rotary member mounted on a fixed position in said housing so as to be rotated interlocking with said motor;
    pulse generating means for generating pulses in number corresponding to a rotational speed of said rotary member during rotation of said rotary member; and
    control means for counting the pulses generated by said pulse generating means to determine a moving distance of said cassette carrying unit, and varying a rotational speed of said motor to assume a value between a maximum rotational speed and a minimum rotational speed as said cassette carrying unit moves closer to a predetermined target position.

7. An apparatus according to claim 6, wherein said cassette carrying unit is a single unit for simultaneously carrying a plurality of cassettes.

8. An apparatus capable of loading a plurality of cassettes, comprising:
    a housing incorporating a tape driving section;
    an opening portion formed in a front wall of said housing;
    a cassette carrying unit which can be horizontally inserted or removed in a front-and-back direction through said opening portion and in which a plurality of cassettes can be placed on a top surface in the front-and-back direction;

a motor for driving said cassette carrying unit horizontally via a gear meshing with a rack of said cassette carrying unit;

position detecting unit for detecting a moving position of said cassette carrying unit; and speed control means for controlling a driving voltage of said motor by referring to position detection data from said position detecting unit, said speed control means controlling said driving voltage to reduce a speed of said motor to assume a value between a maximum rotational speed and a minimum rotational speed before said cassette carrying unit reaches a predetermined stop position.

9. An apparatus according to claim 8, wherein said cassette carrying unit is a single unit for simultaneously carrying a plurality of cassettes.

10. An apparatus capable of loading a plurality of cassettes, comprising:

a housing incorporating a tape driving section;

an opening portion formed in a front wall of said housing;

a cassette carrying unit which can be horizontally inserted or removed in a front-and-back direction through said opening portion and in which a plurality of cassettes can be placed on a top surface in the front-and-back direction; and clicking means for stopping said cassette carrying unit at a desired position, said clicking means provided midway along a horizontal moving path of said cassette carrying unit inside said housing and elastically fit on a projection of said cassette carrying unit in correspondence with a position at which said cassette carrying unit stops.

11. An apparatus according to claim 10, wherein said cassette carrying unit is a single unit for simultaneously carrying a plurality of cassettes.

12. An apparatus capable of loading a plurality of cassette, comprising:

a housing incorporating a tape driving section;

an opening portion formed in a front wall of said housing;

a cassette carrying unit which can be inserted or removed horizontally through said opening portion and in which cassettes can be loaded in a plurality of regions on a top surface, respectively;

a horizontal motor for rotating a gear to be meshed with a rack of said cassette carrying unit to serve as a power source for moving said cassette carrying unit horizontally;

pantograph mechanisms, attached to respective regions of said cassette carrying unit, each one of said pantograph mechanisms for vertically moving a corresponding cassette support plate, each said cassette support plate for receiving horizontally loaded cassettes;

a pantograph driving mechanism, provided at a predetermined position in said housing, for selectively driving each of said pantograph mechanisms to vertically move a corresponding said cassette support plate; and a vertical motor for applying a rotational force to a rotary member of said pantograph driving mechanism to serve as a power source of said pantograph mechanisms.

13. An apparatus according to claim 12, wherein said vertical motor is a motor for exclusively driving said pantograph mechanisms.

14. An apparatus according to claim 12, wherein said vertical motor is a capstan motor, and said pantograph driving mechanism has means for selectively switching a rotational force of said capstan motor and applying the selected rotational force to said pantograph mechanisms.

15. An apparatus according to claim 12, wherein said cassette carrying unit is a single unit for simultaneously carrying a plurality of cassettes.

16. An apparatus capable of loading a plurality of cassettes, comprising:

a housing incorporating a tape driving section;

an opening portion formed in a front wall of said housing;

a cassette carrying unit, which can be inserted or removed horizontally in a front-and-back direction through said opening, having bottom plates, and in which a cassette can be placed on each of said bottom plates;

pantograph mechanisms, attached to said cassette carrying unit, each one of said pantograph mechanisms corresponding to each one of said bottom plates for moving said bottom plates vertically, and each one of said pantograph mechanisms having an intermediate member;

a locking member corresponding to each one of said pantograph mechanisms, each said locking member mounted on said cassette carrying unit, each said locking member for holding a corresponding one of said bottom plates at a position in a horizontal moving path of said cassette carrying unit by engaging an intermediate member of a corresponding one of said pantograph mechanisms; and pantograph driving means, provided at a fixed position in said housing, for selectively operating said pantograph mechanisms of said cassette carrying unit by releasing the engagement between an intermediate member of a selected one of said pantograph mechanisms and a corresponding said locking member and driving said selected one of said pantograph mechanisms to move a corresponding one of said bottom plates downward when said cassette carrying unit moves to a predetermined position in a horizontal moving direction.

17. An apparatus according to claim 16, further comprising a landing mechanism corresponding to each one of said pantograph mechanisms, each said landing mechanism for slightly raising a corresponding said intermediate member and then moving said corresponding intermediate member downward, and for interlocking with the operation of a corresponding one of said pantograph mechanisms, so as to release the engaged state between said corresponding intermediate member and a corresponding said locking member.

18. An apparatus according to claim 17, wherein each said landing mechanism includes a pivotal lever with a pivoting distal end portion, each said pivotal level supports a corresponding one of said bottom plates of a corresponding one of said pantograph mechanisms and vertically moves said pivoting distal end portion; and wherein a cam drives each said pivotal lever.

19. An apparatus according to claim 16, wherein each said locking member includes a locking portion, each said intermediate member includes a first pin and a notched portion, each said first pin engages a corresponding said locking portion to hold a corresponding one of said bottom plates, each one of said pantograph mechanisms includes a pivotal member which pushes a corresponding said first pin to release the engagement between a corresponding said intermediate member and a corresponding said locking portion, and each said pivotal member includes a second pin which engages a corresponding said notched portion.

20. An apparatus according to claim 16, wherein said cassette carrying unit is a single unit for simultaneously carrying a plurality of cassettes.

21. An apparatus capable of loading a plurality of cassettes, comprising:

a housing incorporating a tape recording and reproducing function;

an opening portion formed in a front wall of said housing;

a cassette carrying unit which can be inserted or removed horizontally in a front-and-back direction through said opening portion and having bottom plates, and in which cassette can be placed in each one of said bottom plates;

pantograph mechanisms, provided in said cassette carrying unit, each one of said pantograph mechanisms for moving a corresponding one of said bottom plates vertically;

a vertical moving member, provided in each of said pantograph mechanisms, for moving vertically as a corresponding one of said pantograph mechanisms moves a corresponding one of said bottom plates vertically, each said vertical moving member having a free end potion;

a guide member provided in said cassette carrying unit associated with each said vertical moving member, each said guide member having a guide groove, an elongated hole with a locking portion and a stopper portion, each said elongated hole engaging a free end portion of a corresponding said vertical moving member, each said locking portion locking a free end portion of a corresponding said vertical moving member to regulate downward movement of said corresponding vertical moving member and being formed in an upper position of a corresponding said guide member, each said stopper portion regulating a lower most position of a corresponding said vertical moving member and being formed in a lower position of a corresponding said guide member, each said guide groove being longer than and parallel to a corresponding said elongated hole; and a driving lever corresponding to each said guide member and provided at a fixed position in said housing, each said driving lever having a pivoting distal end portion for inserting into a corresponding said guide groove to vertically drive a corresponding said vertical moving member of a corresponding one of said pantograph mechanisms, each said pivoting distal end portion being inserted into a corresponding said guide groove to displace a corresponding said free end portion to release the engagement between a corresponding said locking portion and said corresponding free end portion, each said pivoting distal end portion being engaged with a corresponding said vertical moving member to drive said corresponding vertical moving member and thus a corresponding one of said pantograph mechanisms to move a cassette downward, and each said pivoting distal end portion pulling a corresponding said vertical moving member and disengaging from a corresponding said guide groove to move said corresponding vertical moving member to a corresponding said locking portion.

22. An apparatus according to claim 21, wherein said cassette carrying unit is a single unit for simultaneously carrying a plurality of cassettes.

23. An apparatus capable of loading a plurality of cassettes, comprising:

a housing incorporating a tape driving section;

a cassette carrying unit having a plurality of cassette holding sections, each cassette holding section being capable of holding a cassette while being located inside said housing, said cassette carrying unit for conveying each cassette holding section holding a cassette to a position from which the conveyed cassette can be loaded in said tape driving section;

a motor mounted at a fixed position in said housing, for moving said cassette carrying unit;

a rotary member mounted at a fixed position in said housing so as to be rotated interlocking with said motor; and pulse generating means, interlocking with the rotation of said rotary member, for generating pulses in number corresponding to a rotational speed of said rotary member to generate data for determining a moving distance of said cassette carrying unit.

* * * * *